US009019625B2

United States Patent
Matsuoka et al.

(10) Patent No.: US 9,019,625 B2
(45) Date of Patent: Apr. 28, 2015

(54) LENS ADVANCING DEVICE, IMAGING DEVICE EQUIPPED WITH LENS ADVANCING DEVICE, AND PORTABLE ELECTRONIC DEVICE

(75) Inventors: Kouichirou Matsuoka, Kyoto (JP); Arata Sakamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/115,910

(22) PCT Filed: Jun. 21, 2012

(86) PCT No.: PCT/JP2012/004031
§ 371 (c)(1),
(2), (4) Date: Nov. 6, 2013

(87) PCT Pub. No.: WO2012/176456
PCT Pub. Date: Dec. 27, 2012

(65) Prior Publication Data
US 2014/0078599 A1    Mar. 20, 2014

(30) Foreign Application Priority Data

Jun. 24, 2011 (JP) ................................. 2011-140227
Jul. 5, 2011 (JP) ................................. 2011-148913

(51) Int. Cl.
| G02B 15/14 | (2006.01) |
| G02B 5/04 | (2006.01) |
| G02B 7/09 | (2006.01) |
| G02B 7/105 | (2006.01) |
| G02B 7/04 | (2006.01) |

(52) U.S. Cl.
CPC ...... *G02B 7/09* (2013.01); *G02B 7/105* (2013.01); *G02B 7/04* (2013.01)

(58) Field of Classification Search
USPC .................. 359/694–704, 811–830
See application file for complete search history.

(56) References Cited

U.S. PATENT DOCUMENTS

| 6,388,826 B2 * | 5/2002 | Iikawa et al. ................. 359/822 |
| 8,270,105 B2 * | 9/2012 | Mori ............................ 359/825 |
| 2008/0291549 A1 * | 11/2008 | Yoshida et al. ............... 359/699 |

FOREIGN PATENT DOCUMENTS

| JP | 62-146101 U | 9/1987 |
| JP | 64-23014 U | 2/1989 |
| JP | 2008-309812 A | 12/2008 |
| JP | 2009-036907 A | 2/2009 |

OTHER PUBLICATIONS

International Search Report for Application No. PCT/JP2012/004031, dated Sep. 4, 2012.

\* cited by examiner

*Primary Examiner* — Mohammed Hasan
(74) *Attorney, Agent, or Firm* — RatnerPrestia

(57) ABSTRACT

A lens advancing device of the present invention includes an advancing ring holding the lens unit; a holder supporting the advancing ring; an operation unit; and a came surface formed on one of the advancing ring and the holder, and an abutting part formed on the other of the advancing ring and the holder and is engageable with the cam surface. The lens unit is disposed along an optical axis by rotating the advancing ring and thereby changing the engaging position between the cam surface and the abutting part. The lens advancing device further includes a pressing part retaining the elastic body be abutment to make the elastic body exert the elastic force upon the advancing ring and press the abutting part against the came surface. This reduces changes of resistance in rotational operation of the advancing ring between photographing modes, which makes the user feel less uncomfortable.

23 Claims, 13 Drawing Sheets

LENS ADVANCING DEVICE, IMAGING DEVICE EQUIPPED WITH LENS ADVANCING DEVICE, AND PORTABLE ELECTRONIC DEVICE

This Application is a U.S. National Phase Application of PCT International Application PCT/JP2012/004031.

TECHNICAL FIELD

The present invention relates to a lens advancing device used for a portable electronic device such as a digital camera and a mobile phone with a camera function, to an imaging device including the lens advancing device, and to a portable electronic device.

BACKGROUND ART

In recent years, portable electronic devices have become widely used such as a digital camera and a mobile phone having a camera (imaging device) function that allows the photographing mode (e.g., normal, macro) to be selectively changed (refer to patent literature 1 for instance).

A portable electronic device of patent literature 1 includes a lens advancing device for selectively changing the photographing mode (e.g., normal, macro).

The lens advancing device includes an advancing ring holding the lens unit, a holder supporting the advancing ring rotatably around the optical axis of the lens unit, a cover holding the advancing ring onto the holder, and an operation unit for rotating the advancing ring.

The lens advancing device is provided with what is called a cam mechanism for transforming rotary motion of the advancing ring to reciprocating motion (back-and-forth motion along the optical axis) of the lens unit. Concretely, the lens advancing device has a cam surface formed on one of the advancing ring and holder, and an abutting part formed on the other of the advancing ring and holder and is engageable with a cam surface. When the operation unit rotates the advancing ring, the engaging position of the abutting part with a cam surface is changed and thereby the advancing ring is displaced along an optical axis of the lens unit. Consequently, the lens unit is displaced along the optical axis.

The lens advancing device is provided on its advancing ring with an elastic body made of synthetic rubber material that is elastically deformable. The lens advancing device is structured so as to exert an elastic force of the elastic body interposed between the advancing ring and the cover in a compressed state, on the advancing ring to press the abutting part against a cam surface.

That is to say, the lens advancing device structured as above uses an elastic force (urging force) caused by compress-deformation of the elastic body for urging the advancing ring. Accordingly, to obtain a sufficient urging force (the amount of compress-deformation) of the elastic body, the hardness of the material of the elastic body itself needs to be set low.

However, a lower hardness of the elastic body itself results in an insufficient urging force on the advancing ring. On the other hand, a higher hardness of the elastic body itself results in an insufficient urging force (the amount of compress-deformation) of the elastic body. Consequently, an error in shape dimensions, for instance, of the elastic body undesirably causes an urging force on the advancing ring to largely fluctuate.

Further, a large fluctuation of an urging force by the elastic body on the advancing ring when switching between photographing modes (e.g., normal, macro) causes resistance in rotational operation of the advancing ring by the operation unit to largely change. Consequently, the user feels uncomfortable when rotating the advancing ring.

CITATION LIST

Patent Literature

PTL 1 Japanese Patent Unexamined Publication No. 2009-36907

SUMMARY OF THE INVENTION

To solve the above problems, a lens advancing device of the present invention includes an advancing ring holding the lens unit; a holder rotatably supporting the advancing ring; an operation unit for rotating the advancing ring, a cam surface formed on one of the advancing ring and the holder, and an abutting part formed on the other of the advancing ring and the holder and is engageable with the cam surface. The lens unit is displaced along an optical axis by rotating the advancing ring and thereby changing the engaging position between the cam surface and the abutting part. The lens advancing device further includes a tapered part formed on the outer circumferential surface of the advancing ring; an elastic body attached to the tapered part; and a pressing part coupled to the holder, and retaining the elastic body by abutment to make the elastic body exert an elastic force upon the advancing ring and press the abutting part against the cam surface.

This structure reduces changes of resistance in rotational operation of the advancing ring by the operation unit when switching between photographing modes (e.g., normal, macro), which makes the user feel less uncomfortable. This reduces influence on individual variations of an urging force (elastic force) due to a dimensional error of the elastic body and its surrounding members.

The lens advancing device of the present invention includes an advancing ring holding the lens unit; a holder rotatably supporting the advancing ring; an operation unit for rotating the advancing ring, a cam surface formed on one of the advancing ring and the holder, and an abutting part formed on other of the advancing ring and the holder and is engageable with the cam surface. The lens unit is displaced along an optical axis by rotating the advancing ring and thereby changing an engaging position between the cam surface and the abutting part. The lens advancing device further includes a placing face formed on the outer circumferential surface of the advancing ring; an elastic body placed on the placing face; and a pressing part coupled to the holder, and retaining the elastic body by abutment to make the elastic body exert an elastic force upon the advancing ring and press the abutting part against a cam surface, the pressing part having a counter face formed at a position facing the placing face. One of the placing face and the counter face is provided thereon with a plurality of first projections formed circumferentially at given intervals. The other of the placing face and the counter face is provided thereon with a plurality of second projections formed circumferentially at given intervals, at positions circumferentially phase-shifted from the first projections. The first projections move between adjacent second projections according to rotation of the advancing ring.

This structure reduces changes of resistance in rotational operation of the advancing ring by the operation unit when switching between photographing modes (e.g., normal, macro), which makes the user feel less uncomfortable. This reduces influence on individual variations of an urging force (elastic force) due to a dimensional error of the elastic body and its surrounding members.

An imaging device of the present invention includes the above-described lens advancing device, which allows the imaging device to easily photograph in various photographing modes (e.g., normal, macro).

A portable electronic device of the present invention includes the above-described imaging device, which allows the portable electronic device (e.g., digital camera, mobile phone with a camera function) to accurately focus at each photographing position (e.g., normal, macro).

DESCRIPTION OF EMBODIMENTS

Hereinafter, a description is made of a lens advancing device according to an exemplary embodiment of the present invention with reference to the related drawings. This exemplary embodiment does not limit the present invention. In the following description, an identical or corresponding component is given the same reference mark. A lens advancing device of this exemplary embodiment selectively changes the photographing mode (e.g., normal, macro) as a camera (imaging device) function of a portable electronic device (e.g., digital camera, mobile phone with a camera function).

FIRST EXEMPLARY EMBODIMENT

Hereinafter, a description is made of a lens advancing device according to the first exemplary embodiment of the present invention using FIGS. 1 through 3B.

Figure 1:
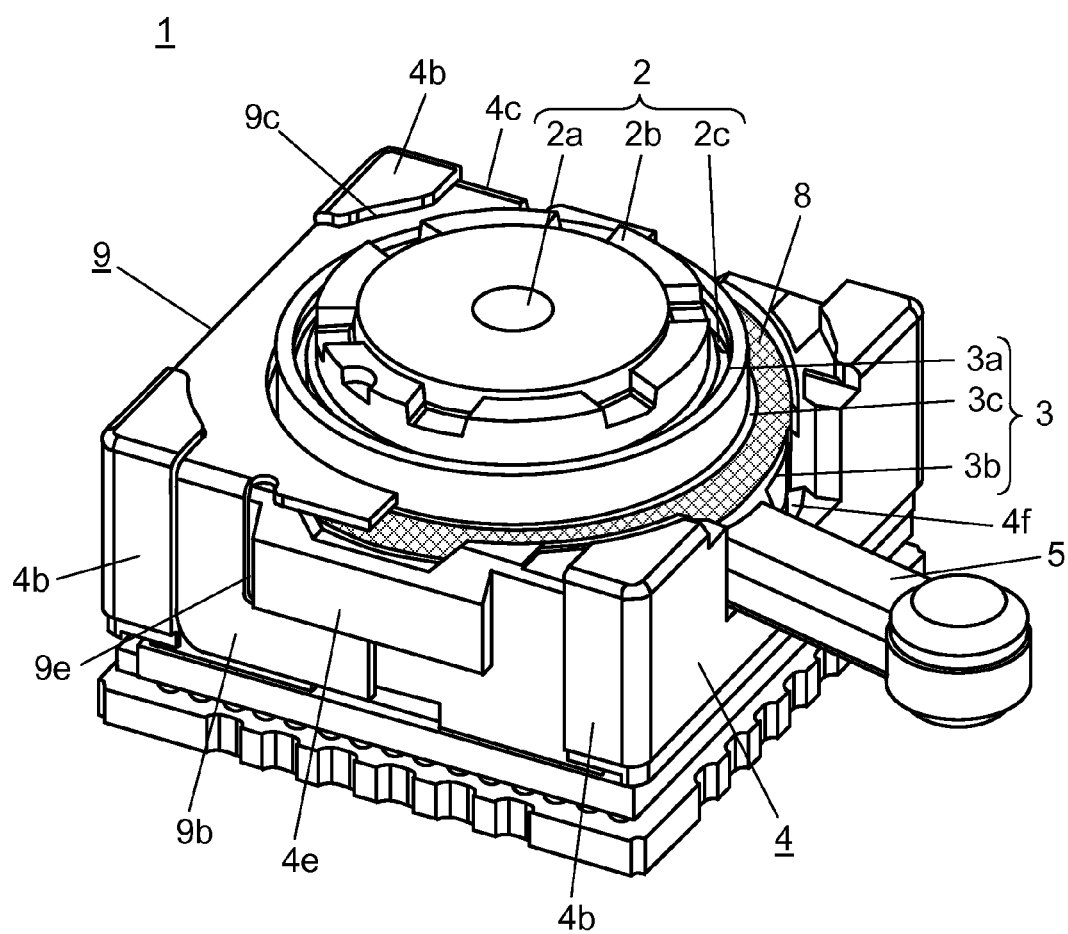
FIG. 1 is a partially cutaway perspective view of a lens advancing device according to a first exemplary embodiment of the present invention.
Figure 2:
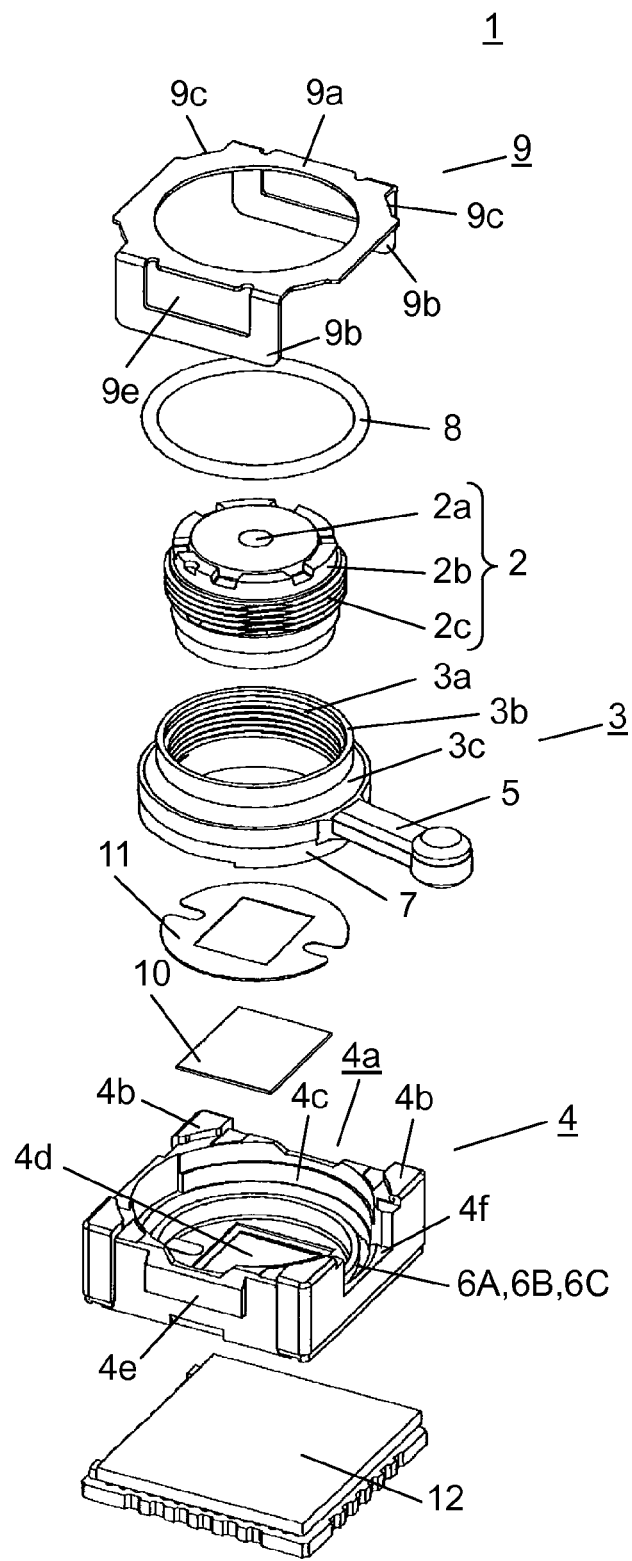
FIG. 2 is an exploded perspective view of the lens advancing device according to the same exemplary embodiment.
Figure 3A:
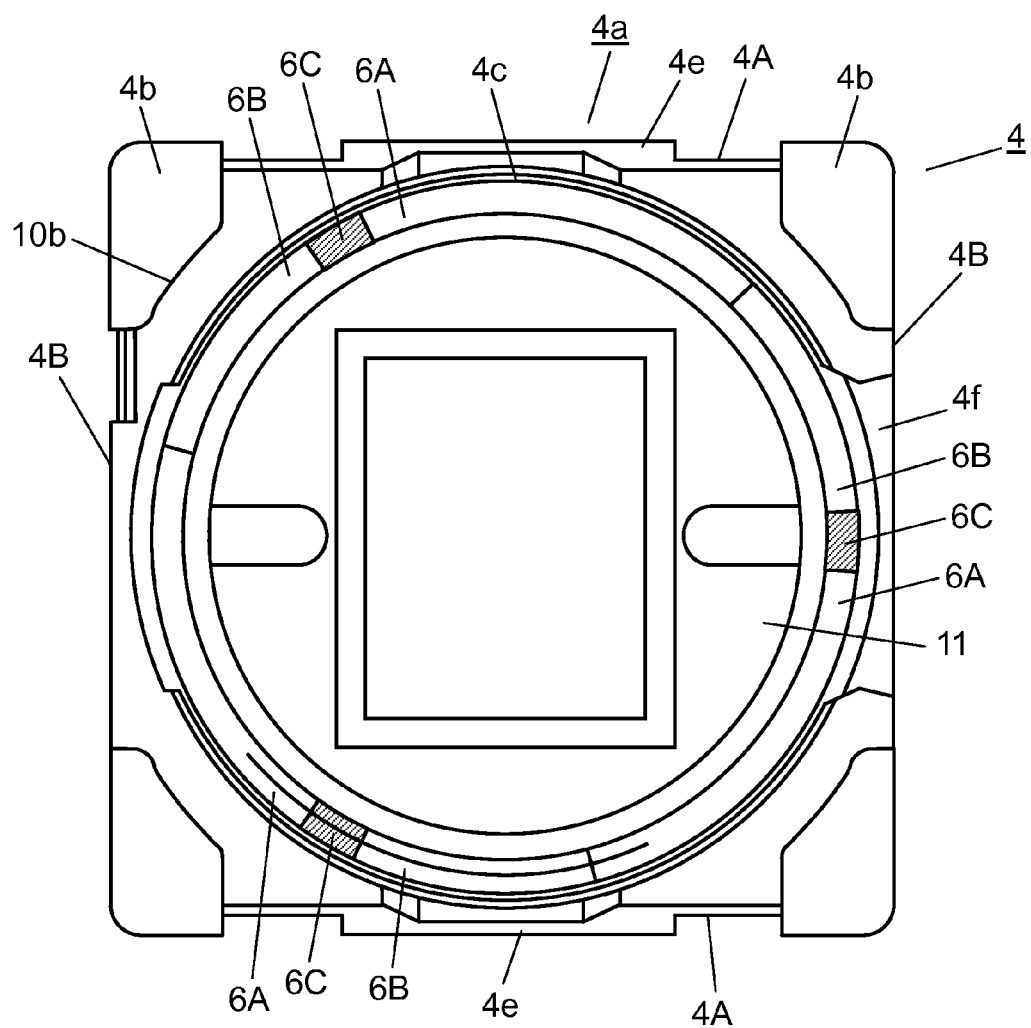
FIG. 3A is a plan view of the holder of the lens advancing device according to the same exemplary embodiment.
Figure 3B:
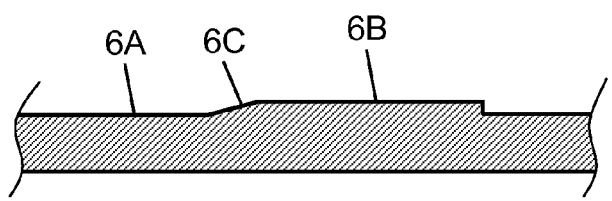
FIG. 3B is a partial sectional view illustrating part of cam surfaces formed on the holder of the lens advancing device according to the same exemplary embodiment.

FIG. 1 is a partially cutaway perspective view of the lens advancing device according to a first exemplary embodiment. FIG. 2 is an exploded perspective view of the lens advancing device according to the same exemplary embodiment. FIG. 3A is a plan view of the holder of the lens advancing device according to the same exemplary embodiment. FIG. 3B is a partial sectional view illustrating part of cam surfaces formed on the holder of the lens advancing device according to the same exemplary embodiment.

First, as shown in FIGS. 1 and 2, lens advancing device 1 according to this exemplary embodiment includes at least lens unit 2; advancing ring 3 holding lens unit 2; holder (base) 4 supporting advancing ring 3 rotatably around the optical axis of lens unit 2; operation unit 5 (e.g., operation lever) for rotating the advancing ring 3; elastic body 8 urging advancing ring 3; and pressing part 9. In this exemplary embodiment, operation unit 5 is integrally provided on the outer circumference of advancing ring 3.

Lens unit 2 is composed of lens 2a and lens holder 2b holding lens 2a. The outer circumferential surface of lens holder 2b has male screw 2c formed thereon that screw-fits female screw 3a formed in the inner circumferential surface of advancing ring 3.

Advancing ring 3 is composed of cylinder 3b into which lens holder 2b is incorporated; tapered part 3c provided on the outer circumference of cylinder 3b; and operation unit 5. The inner circumferential surface of cylinder 3b of advancing ring 3 has female screw 3a formed therein. Then, male screw 2c formed on the outer circumferential surface of lens holder 2b is screwed to female screw 3a to cause lens holder 2b to be incorporated into cylinder 3b of advancing ring 3. Tapered part 3c formed on the outer circumferential surface of advancing ring 3 has elastic body 8 attached thereto that is substantially or completely ring-shaped, for example, and is circular as viewed in a cross section, made of synthetic rubber, for example. At this moment, advancing ring 3 is formed so that its diameter at a position where it contacts tapered part 3c of advancing ring 3 is larger than the internal diameter of the elastic body 8.

Here, it is favorable that lens 2a, lens holder 2b, holder 4, and operation unit 5 are typically made of the following resin material, for example, with the same thermal expansion coefficient. This keeps a fit of each component material uniform to allow smooth rotational operation and also prevents distortion due to deformation, for example, to provide high positioning accuracy.

For lens 2a as an example, thickness reduction is demanded as follows for instance. 3.5 mm≤external diameter (D) of lens≤6.0 mm, 2.9 mm≤effective diameter (E.D.) of lens≤5.4 mm, 0.3 mm≤circumferential thickness (s) at effective diameter of lens≤0.5 mm, 0.7 mm≤center thickness (t) at effective diameter of lens≤1.0 mm, and 1.75 mm≤distance (E) from center to D cut surface of outer circumference of lens≤2.9 mm. As a result, to reduce internal distortion due to thickness reduction of lens 2a, a resin material of the lens satisfying the following conditions is favorable. (1) s≤0.65, (2) 26.0≤Abbe's number (υd)≤55.8, 104≤bending strength (σb[MPa])≤125, or (3) 1.53≤refractive index (Nd)≤1.62, 104≤σb≤125. Concrete examples include ZEONEX E48R (trade name) and ZEONEX F52R (trade name) made by ZEON Corporation, and OKP4 (trade name) made by Osaka Gas Chemicals Co., Ltd., where what is especially favorable is SP-1516 (trade name) made by Teijin Chemicals Ltd.

For lens holder 2b, a resin material with its thermal expansion coefficient substantially equal to that of lens 2a is favorable such as polycarbonate resin and PET resin.

For holder 4 and operation unit 5, resin materials with their thermal expansion coefficients substantially equal to each other and at the same time with high mechanical strength and excellent sliding characteristics is favorable such as polyarylate. This is because abutting part 7 formed on operation unit 5 abuts cam surfaces 6A, 6C, and 6B formed on holder 4, for instance, and slides with rotational operation, as described in the following. This structure reduces changes of resistance in rotational operation of the advancing ring by the operation unit when switching between photographing modes (e.g., normal, macro), which makes the user feel less uncomfortable.

As shown in FIGS. 1 through 3B, holder 4 serving as the base of lens advancing device 1 of this exemplary embodiment is composed of supporting part 4a having projections 4b supporting advancing ring 3; protrusions 4e fixing pressing part 9; and cylindrical part 4c rotatably displacing advancing ring 3. At this moment, projections 4b are placed at the four corners, for instance, of supporting part 4a. Cylindrical part 4c is formed inside supporting part 4a and each of projections 4b.

Then as shown in FIGS. 2 and 3A, the bottom of cylindrical part 4c of holder 4 has opening 4d formed therein. Opening 4d has transparent plate 10 inserted thereinto and retaining plate 11 attached thereto so that transparent plate 10 is not detached from opening 4d.

Holder 4 is provided with protrusions 4e engaging pressing part 9 between projections 4b on opposing surfaces 4A of holder 4, and protrusions 4e engage opening 9e in projection 9b formed on pressing part 9 (described later). Further, holder 4 includes cutout 4f that makes operation unit 5 of advancing ring 3 project to the outside of holder 4 and makes operation unit 5 operate rotatably, on at least one of the two surfaces 4B orthogonally facing opposing surfaces 4A of holder 4.

As shown in FIGS. 1 and 2, pressing part 9, unified with holder 4 in the manner described below, abut-supports elastic body 8 and exerts an elastic force (urging force) on tapered part 3c of advancing ring 3 through elastic body 8. This exerts the elastic force of elastic body 8 on advancing ring 3 to press abutting part 7 of advancing ring 3 against cam surfaces 6A, 6C, and 6B (described later) of holder 4. At this moment, elastic body 8 presses abutting part 7 along the optical axis of lens unit 2 and orthogonality across the optical axis (in the radial direction of advancing ring 3) as well. In other words, the urging force (elastic force) of elastic body 8 by pressing part 9 is dispersively exerted along the optical axis of lens unit 2 and orthogonally across the optical axis (in the radial direction of advancing ring 3).

Further, pressing part 9 includes plain plate 9a that presses advancing ring 3 through elastic body 8; and two projections 9b provided vertically to at least two opposing sides of plain plate 9a. Here, the four corners of plain plate 9a have abutting recesses 9c formed therein abutting the inner surfaces of projections 4b of holder 4.

Opening 9e formed in projection 9b of pressing part 9 engages protrusions 4e formed on holder 4 described above. This makes pressing part (cover) 9 engage holder 4, which causes presses pressing part 9 to press elastic body 8 against tapered part 3c on the outer circumferential surface of cylinder 3b of advancing ring 3. Consequently, the urging force of elastic body 8 is exerted on advancing ring 3, which presses abutting part 7 against cam surfaces 6A, 6C, and 6B.

Figure 4B:
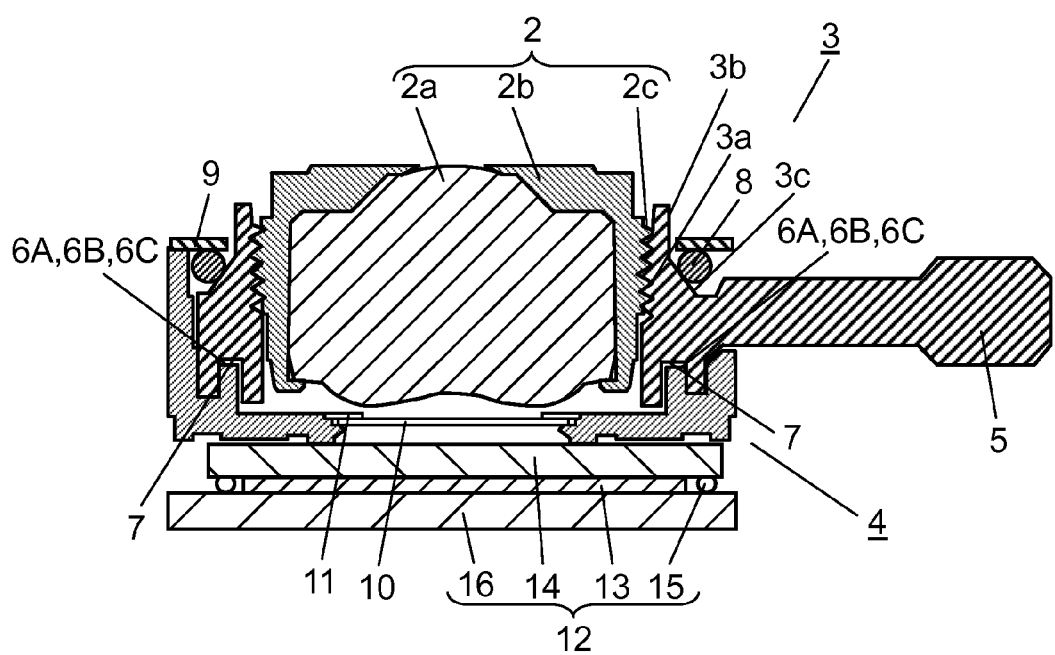
FIG. 4B is a sectional view of the lens advancing device in normal photographing according to the same exemplary embodiment.
Figure 5A:
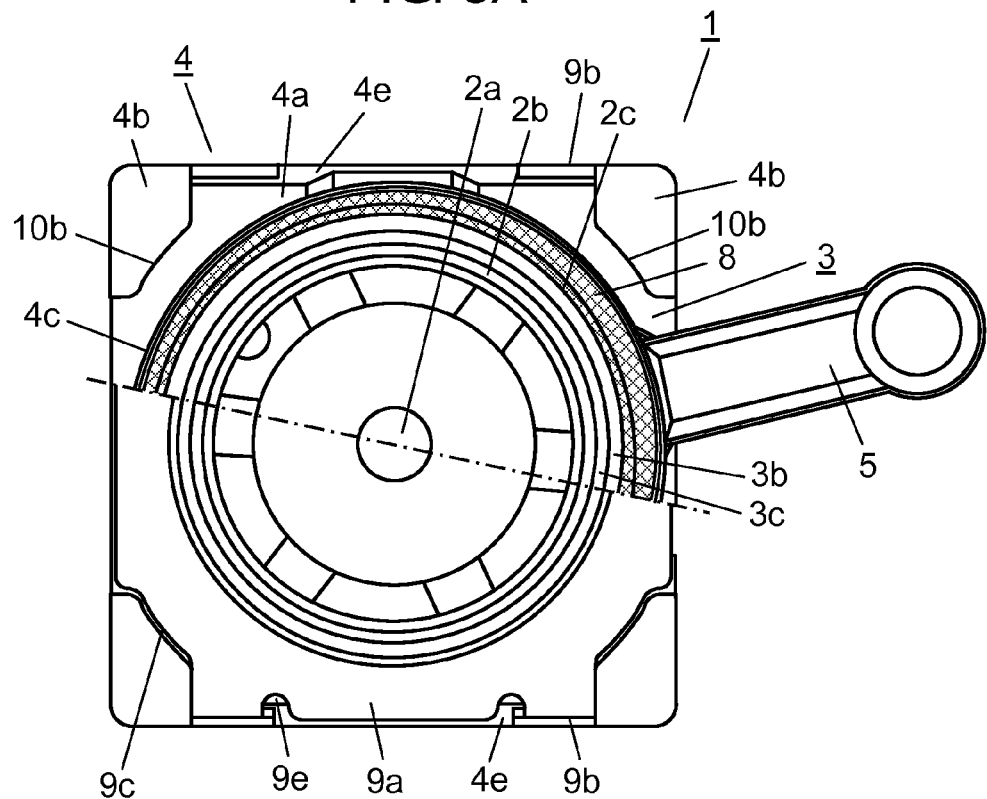
FIG. 5A is a cutaway plan view of the lens advancing in macro photographing according to the same exemplary embodiment.
Figure 5B:
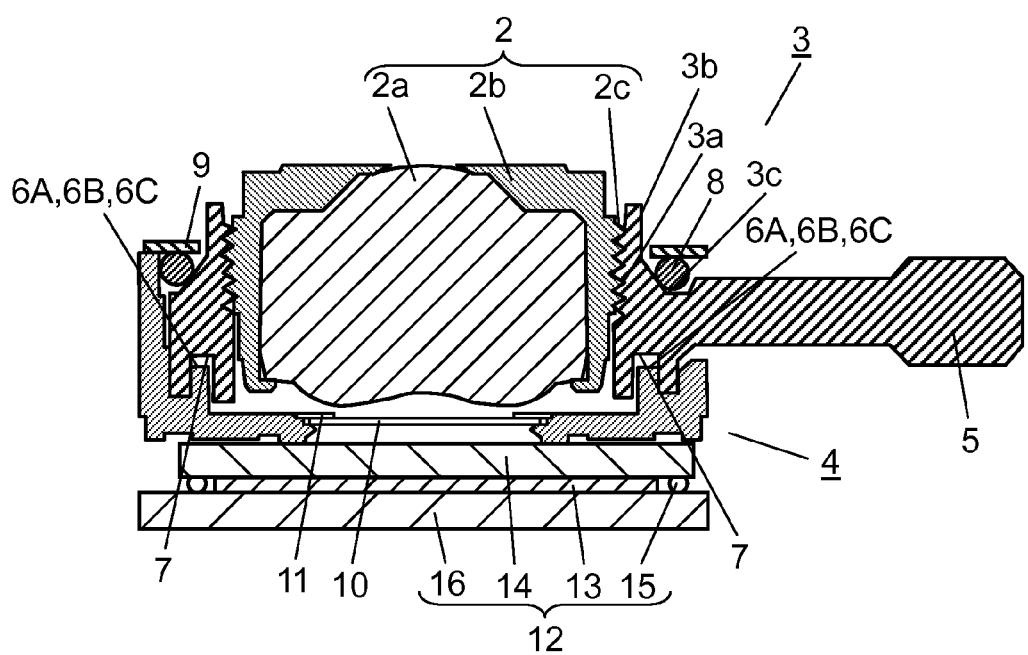
FIG. 5B is a sectional view of the lens advancing device in macro photographing according to the same exemplary embodiment.

As shown in FIG. 2, the undersurface of holder 4 has sensor assembly 12 attached thereon. As shown in FIGS. 4B and 5B (described later), sensor assembly 12 is composed of imaging element 13, transparent plate 14, and substrate 16. Imaging element 13 light-collects optical images of a photographic subject through lens 2a. Transparent plate 14 holds imaging element 13 and has a circuit pattern (not shown) electrically connected to imaging element 13, on the front surface of transparent plate 14. Further, substrate 16 has imaging element 13 implemented thereon through solder ball 15 electrically connected to the circuit pattern and its terminals of transparent plate 14.

As shown in FIGS. 2 through 3B, advancing ring 3 is rotatably retained and accommodated movably along the optical axis inside cylindrical part 4c of holder 4. Then, either one of advancing ring 3 and holder 4 has cam surfaces 6A, 6C, and 6B formed thereon; the other of advancing ring 3 and holder 4 has abutting part 7 formed thereon capable of engaging cam surfaces 6A, 6C, and 6B. Here, abutting part 7 and cam surfaces 6A, 6C, and 6B are provided at least three positions facing each other at regular intervals along the circumference of advancing ring 3. This allows advancing ring 3 to engage holder 4 parallel with high accuracy.

At this moment, rotating advancing ring 3 by operation unit 5 changes the engaging position of abutting part 7 with cam surfaces 6A, 6C, and 6B, which displaces advancing ring 3 along the optical axis of lens unit 2. Consequently, lens unit 2 is displaced along the optical axis.

Concretely, as shown in FIG. 3B, cam surfaces 6A, 6C, and 6B are formed unevenly (in different heights) with supporting part 4a of holder 4 so that cam surface 6B is higher than cam surface 6A. Cam surfaces 6A and 6B are continuously connected to each other on the slope of cam surface 6C. At this moment, setting is made so that cam surface 6A corresponds to the normal photographing mode; and cam surface 6B, to macro photographing mode. Here, it is favorable that proper curvature be provided so that cam surfaces 6A and 6B are continuously connected to each other on the slope of cam surface 6C, which allows the photographing mode to be changed smoothly between normal and macro.

Hereinafter, a description is made of operation of lens advancing device 1 using FIGS. 4A through 5B, for the case where holder 4 has cam surfaces 6A, 6C, and 6B formed thereon and advancing ring 3 has abutting part 7 formed thereon capable of engaging cam surfaces 6A, 6C, and 6B, as an example.

Figure 4A:
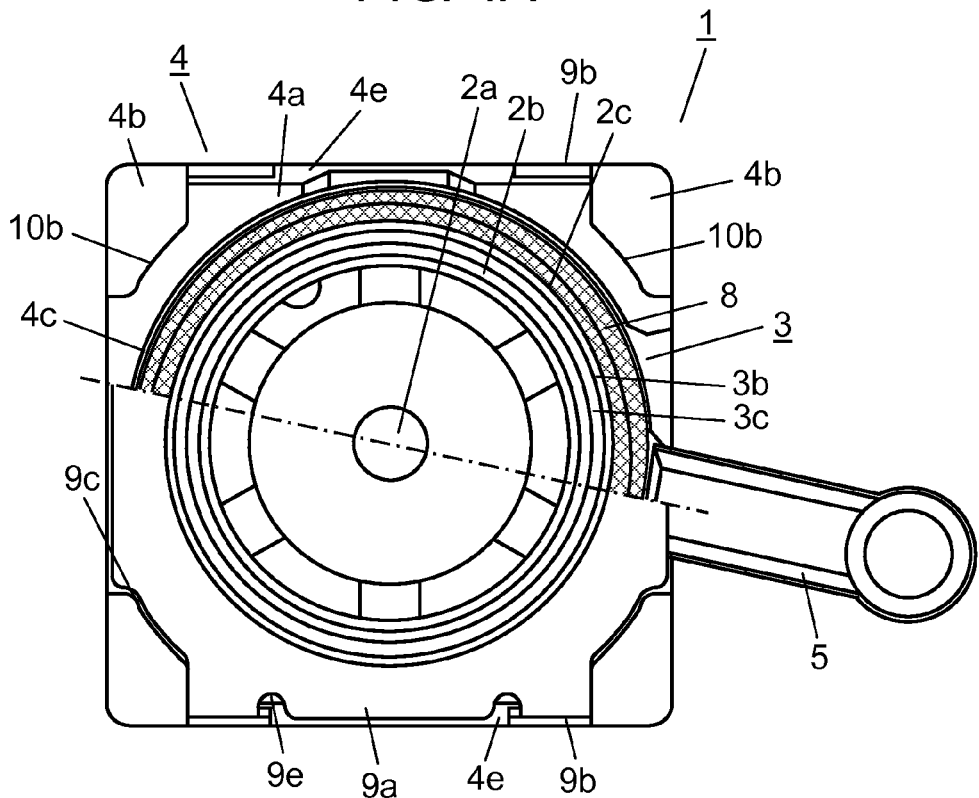
FIG. 4A is a cutaway plan view of the lens advancing device in normal photographing according to the same exemplary embodiment.

FIG. 4A is a cutaway plan view of the lens advancing device in normal photographing according to the same exemplary embodiment. FIG. 4B is a sectional view of the lens advancing device in normal photographing according to the same exemplary embodiment. FIG. 5A is a cutaway plan view of the lens advancing device in macro photographing according to the same exemplary embodiment. FIG. 5B is a sectional view of the lens advancing device in macro photographing according to the same exemplary embodiment.

First, as shown in FIGS. 4A and 4B, operation unit 5 rotates advancing ring 3 to make abutting part 7 of advancing ring 3 engage cam surface 6A of holder 4. This causes lens unit 2 to be displaced along the optical axis to change the photographing mode to normal. Meanwhile, as shown in FIGS. 5A and 5B, operation unit 5 rotates advancing ring 3 to make abutting part 7 of advancing ring 3 engage cam surface 6B of holder 4. This causes lens unit 2 to be displaced along the optical axis to change the photographing mode to macro. In other words, changing the engagement of abutting part 7 of advancing ring 3 with cam surfaces 6A and 6B of holder 4 through cam surface 6C allows the photographing mode to be smoothly changed between normal and macro.

Hereinafter, a description is made of an example of how to assemble lens advancing device 1 according to the exemplary embodiment structured as above referring to FIG. 2.

First, attach elastic body 8 to tapered part 3c of advancing ring 3.

Next, place advancing ring 3 with elastic body 8 attached thereto on supporting part 4a of holder 4 with transparent plate 10 and retaining plate 11 attached to opening 4d. At this moment, abutting part 7 of advancing ring 3 is placed inside cylindrical part 4c formed inside supporting part 4a and projections 4b, and is mounted in a state where abutting part 7 engages either one of cam surfaces 6A and 6B, for instance.

Next, place pressing part 9 onto advancing ring 3 mounted on holder 4 to unify them. At this moment, protrusions 4e formed on holder 4 engage opening 9e in projection 9b formed on pressing part 9 to mount advancing ring 3 to holder 4. This allows advancing ring 3 mounted to holder 4 by pressing part 9 to be rotatably retained inside cylindrical part 4c of holder 4. In other words, advancing ring 3, positioned between pressing part 9 and supporting part 4a of holder 4, is placed movably (displaceably) along the optical axis.

At this moment, elastic body 8 attached between pressing part 9 and tapered part 3c of advancing ring 3 is pressed against tapered part 3c by pressing part 9. This causes elastic body 8 to be elastically deformed in the radial direction as well as along the optical axis of lens advancing device 1. Then, an elastic force due to elastic deformation of elastic body 8 causes abutting part 7 of advancing ring 3 to be pressed against either one of cam surfaces 6A and 6B.

Next, after mounting advancing ring 3, rotate operation unit 5 to the position of the normal photographing mode as shown in FIGS. 4A and 4B. This allows advancing ring 3 to be retained in a state where abutting part 7 of advancing ring 3 pressed against cam surface 6A of holder 4.

Next, screw-fit male screw 2c formed on the outer circumferential surface of lens holder 2b into female screw 3a formed in the inner circumferential surface of advancing ring 3 in a state where advancing ring 3 is retained.

Next, attach sensor assembly 12 onto the undersurface of holder 4. This step may be performed when transparent plate 10 and retaining plate 11 are first attached to opening 4d of first sensor assembly 12. To adjust lens unit 2 shown below without using imaging element 13 of sensor assembly 12, the step may be performed in the final step.

Next, after adjusting the focus distance of lens unit 2, unify advancing ring 3 and lens holder 2b with an adhesive, for instance.

Meanwhile, as shown in FIGS. 5A and 5B, rotating operation unit 5 to the position of the macro photographing mode allows abutting part 7 of advancing ring 3 to be retained in a state pressed against cam surface 6B of holder 4.

The above method completes assembling of lens advancing device 1 according to the exemplary embodiment that smoothly changes the photographing mode between normal and macro through rotational operation of operation unit 5.

According to this exemplary embodiment, in which tapered part 3c is provided on the outer circumferential surface of cylinder 3b of advancing ring 3, elastic body 8 integrally formed between pressing part 9 and holder 4 is pressed along the optical axis of lens unit 2 and at the same time orthogonally across the optical axis (in the radial direction of advancing ring 3). In other words, the urging force (elastic force) of elastic body 8 by pressing part 9 is dispersed along the optical axis of lens unit 2 and orthogonally across the optical axis (in the radial direction of advancing ring 3). Herewith, elastic body 8 urges tapered part 3c with the aid of a reactive force due to elastic deformation in the radial direction of lens advancing device 1. Consequently, load fluctuation in the moving direction (optical axis direction) of lens unit 2 becomes relatively small, thereby smoothly rotating advancing ring 3.

Hence, rotating operation unit 5 allows cam surfaces 6A and 6B engaging abutting part 7 to be smoothly changed, thereby changing the photographing mode (e.g., normal, macro) without unnatural feeling.

Figure 6:
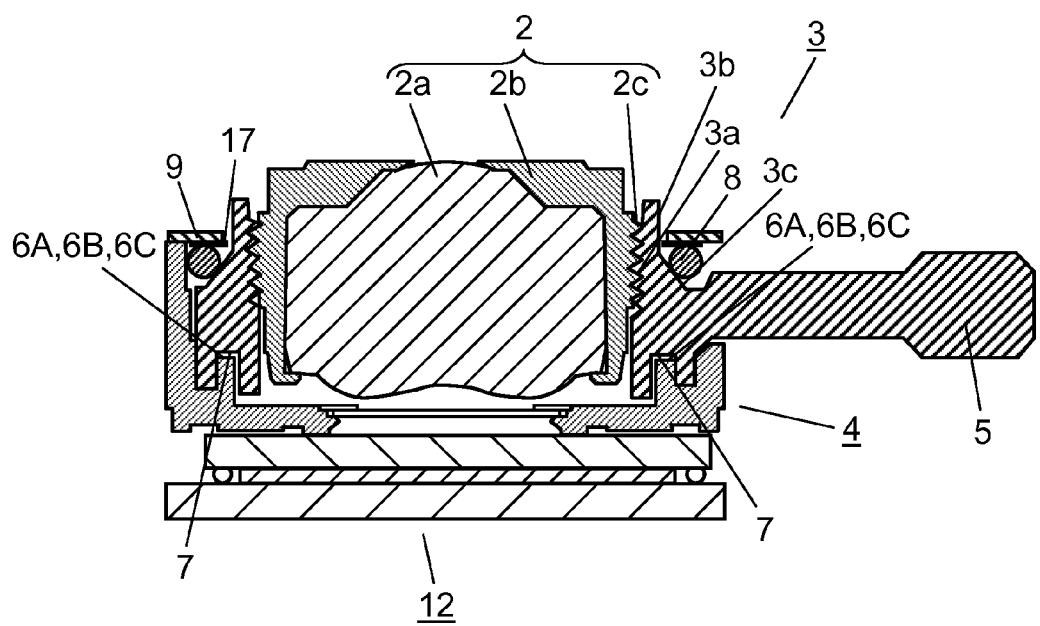
FIG. 6 is a sectional view of another example of the lens advancing device according to the same exemplary embodiment.

Hereinafter, a description is made of another example of the lens advancing device according to the exemplary embodiment using FIG. 6. FIG. 6 is a sectional view of another example of the lens advancing device according to the same exemplary embodiment.

This lens advancing device is different from that of the first exemplary embodiment in that spacer 17, sheet-like for instance, with its friction coefficient smaller than that of elastic body 8 is placed between pressing part 9 and elastic body 8. The other components and actions are the same as those of the first exemplary embodiment and thus their descriptions are omitted.

As shown in FIG. 6, place sheet-like spacer 17 made of PET (polyethylene terephthalate), for instance, with its frictional resistance lower than that of elastic body 8 made of synthetic rubber, for instance, between pressing part 9 and elastic body 8. Then, integrally mount holder 4 and pressing part 9 through spacer 17 and elastic body 8 to form a lens advancing device.

This reduces the frictional resistance between pressing part 9 and elastic body 8, which provides a lens advancing device that smoothly performs rotational operation of advancing ring 3 by operation unit 5.

Figure 7:
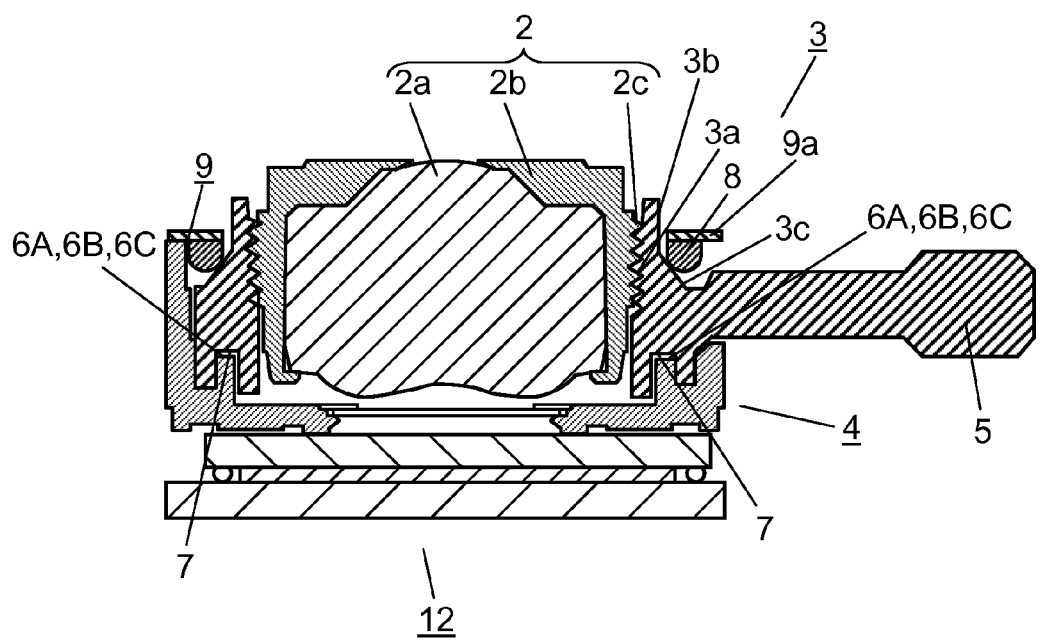
FIG. 7 is a sectional view of yet another example of the lens advancing device according to the same exemplary embodiment.

Hereinafter, a description is made of yet another example of the lens advancing device according to the exemplary embodiment using FIG. 7. FIG. 7 is a sectional view of yet another example of the lens advancing device according to the same exemplary embodiment.

As shown in FIG. 7, the lens advancing device is different from the first exemplary embodiment in that the cross-section shape of elastic body 8 is arc-shaped as viewed in a cross section at the contact surface of advancing ring 3 with tapered part 3c and rectangular as viewed in a cross section at the contact surface with plain plate 9a at pressing part 9. The other components and actions are the same as those of the first exemplary embodiment and thus their descriptions are omitted.

The arc-shaped contact surface of elastic body 8 with tapered part 3c causes elastic body 8 to line-contact tapered part 3c. Meanwhile, the rectangular contact surface of elastic body 8 with pressing part 9 causes elastic body 8 to surface-contact pressing part 9. As a result, the frictional resistance between elastic body 8 and pressing part 9 is larger than that between elastic body 8 and tapered part 3c. Accordingly, elastic body 8 does not slide on pressing part 9 but slides on tapered part 3c smoothly in rotational operation of advancing ring 3 by operation unit 5. This provides a lens advancing device that performs stable rotational operation of advancing ring 3 by operation unit 5.

Incorporating each lens advancing device above provides an imaging device of the exemplary embodiment. Herewith, rotating the advancing ring by the operation unit displaces the advancing ring along the optical axis of the lens unit and further displaces the lens unit along the optical axis, which allows the imaging device to easily photograph in various photographing modes (e.g., normal, macro).

Incorporating the above imaging device provides a portable electronic device, which allows the portable electronic device (e.g., digital camera, mobile phone with a camera function) that accurately focuses at each photographing position (e.g., normal, macro) and excels in operability.

Figure 8:
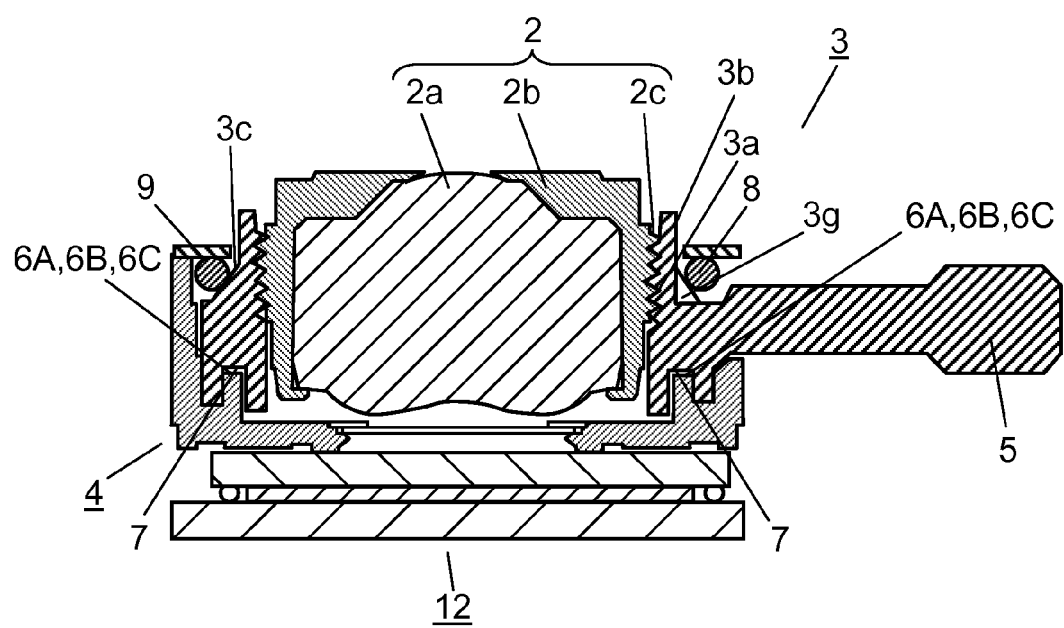
FIG. 8 is a sectional view of still another example of the lens advancing device according to the same exemplary embodiment.

Hereinafter, a description is made of still another example of the lens advancing device according to the exemplary embodiment using FIG. 8. FIG. 8 is a sectional view of still another example of the lens advancing device according to the same exemplary embodiment.

The lens advancing device is different from the first exemplary embodiment in that tapered part 3c of advancing ring 3 is provided with cutouts 3g. The other components and actions are the same as those of the first exemplary embodiment and thus their descriptions are omitted.

As shown in FIG. 8, tapered part 3c of advancing ring 3 is provided with cutouts 3g along the circumference of tapered part 3c at even intervals of 60°, for instance.

This reduces the area size of the contact surface of elastic body 8 with tapered part 3c to lower the frictional resistance between elastic body 8 and advancing ring 3. The contact surface of tapered part 3c urged by elastic body 8 can be limited, which provides a lens advancing device that performs more stable rotational operation of advancing ring 3.

SECOND EXEMPLARY EMBODIMENT

Hereinafter, a description is made of a lens advancing device according to the second exemplary embodiment of the present invention using FIGS. 9 through 11B. The lens advancing device of the second exemplary embodiment has the same basic structure as that of lens advancing device 1 of the first exemplary embodiment, and thus a same component is described simply and a description is made centering on components different from the first exemplary embodiment.

To sum up, the lens advancing device of this exemplary embodiment is different from that of the first exemplary embodiment in that the outer circumference of the advancing ring is provided with a placing face and that first projections are provided on either one of the holder and the advancing ring (both having a counter face) and second projections are provided on the other to press the elastic body.

Figure 9:
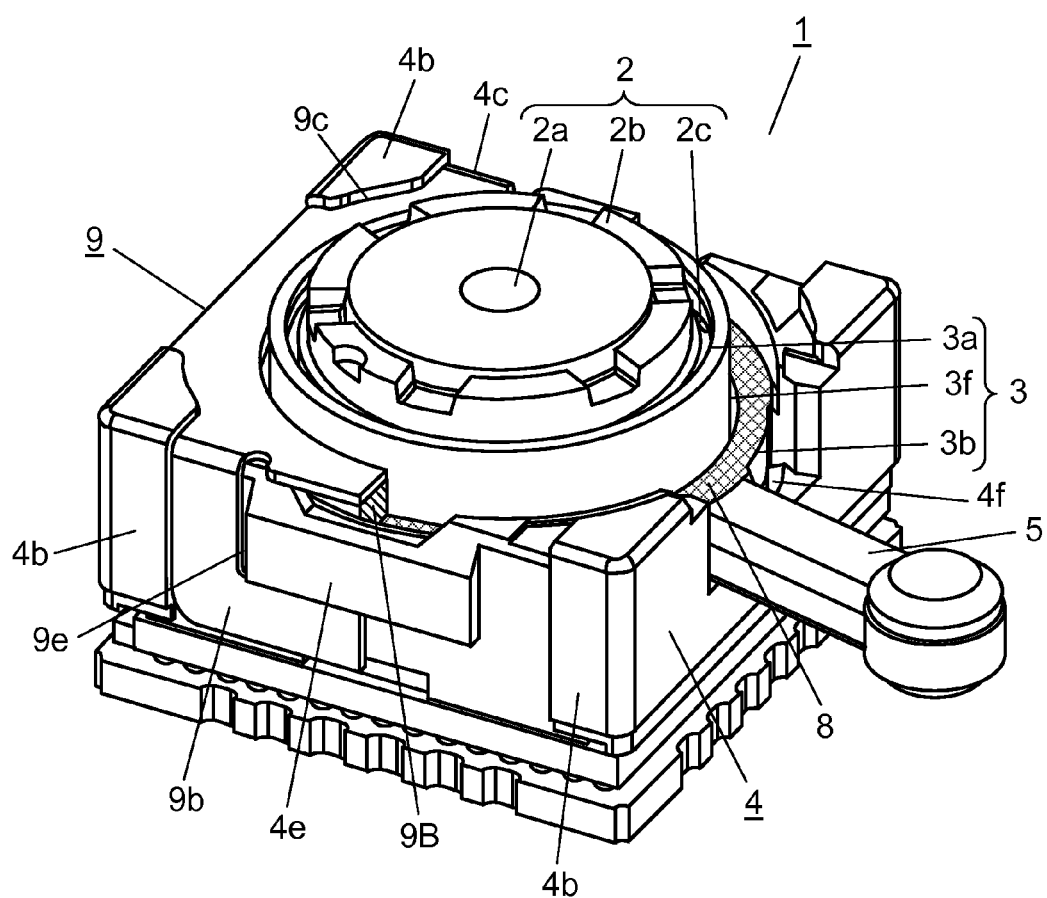
FIG. 9 is a partially cutaway perspective view of a lens advancing device according to a second exemplary embodiment of the present invention.
Figure 10:
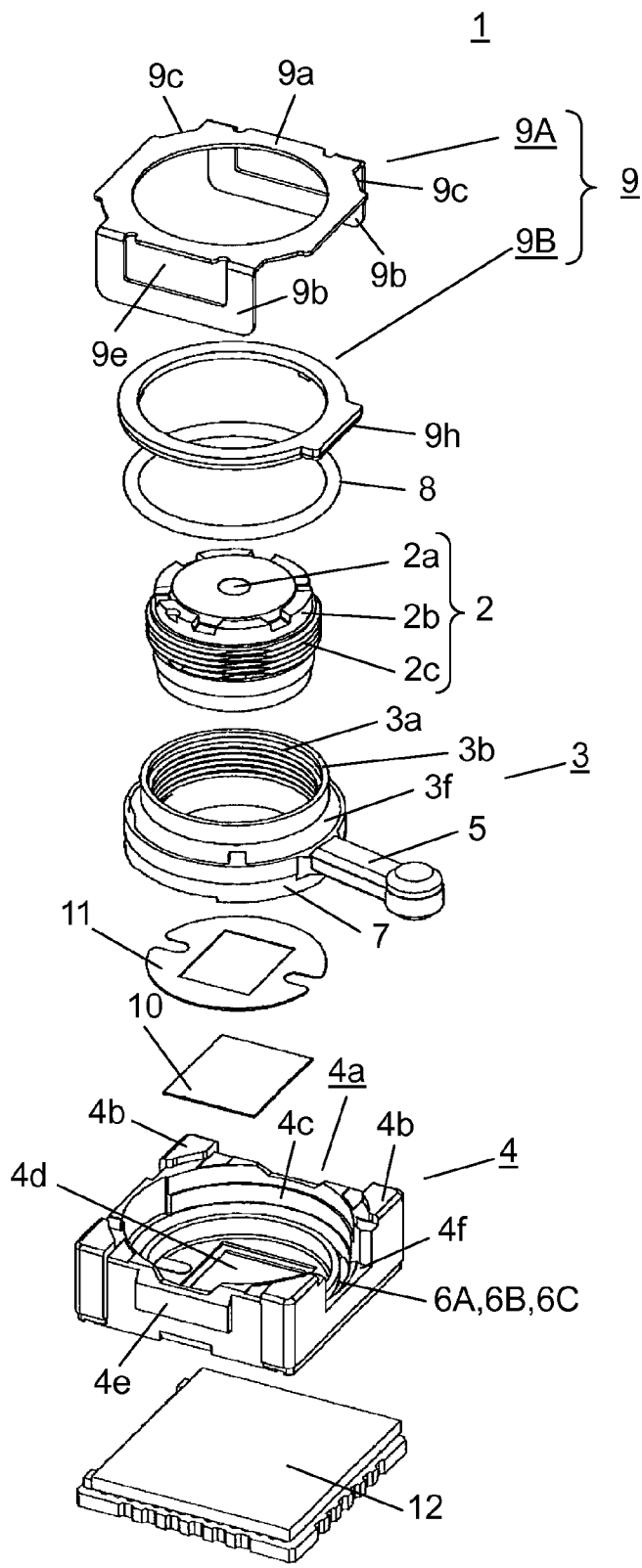
FIG. 10 is an exploded perspective view of the lens advancing device according to the same exemplary embodiment.
Figure 11A:
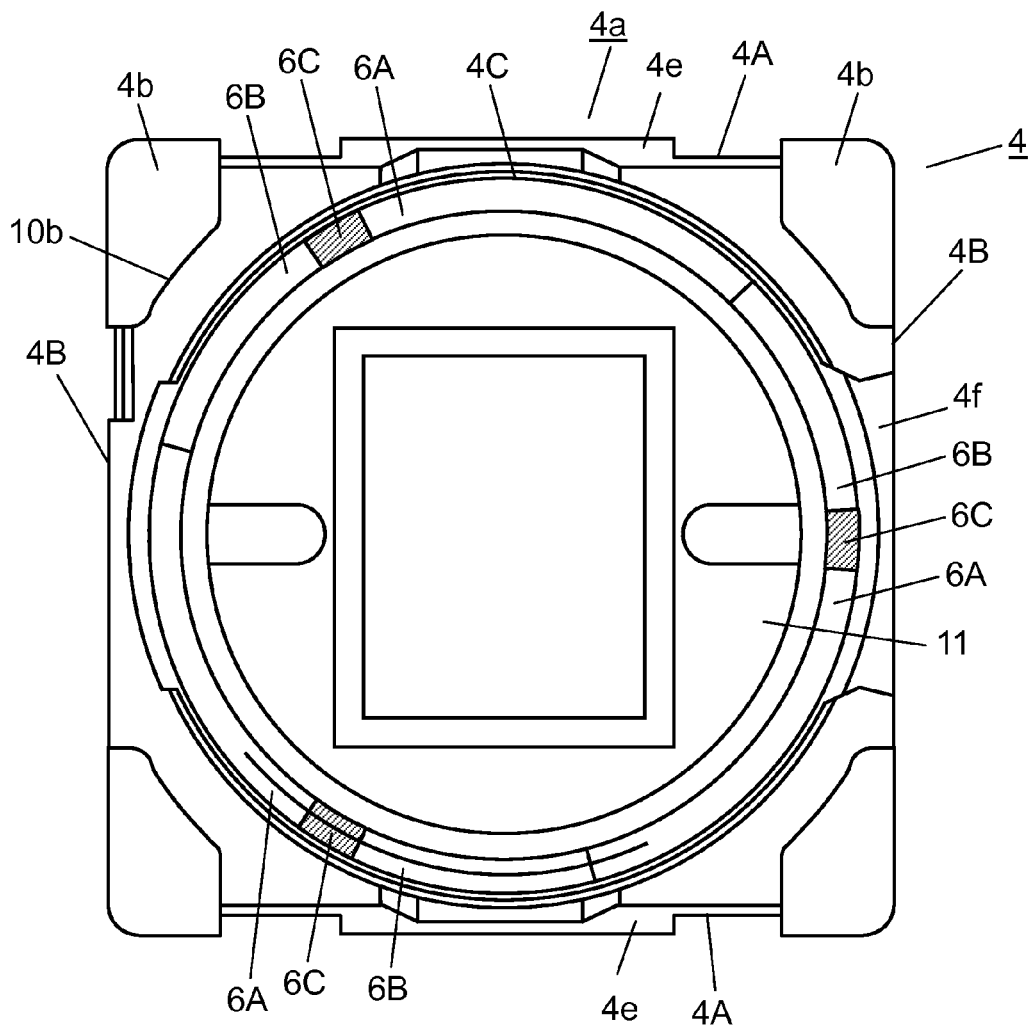
FIG. 11A is a plan view of the holder of the lens advancing device according to the same exemplary embodiment.
Figure 11B:
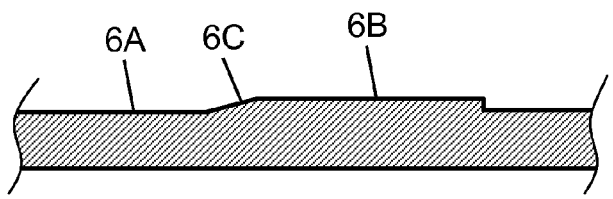
FIG. 11B a partial sectional view illustrating part of cam surfaces formed on the holder of the lens advancing device according to the same exemplary embodiment.

FIG. 9 is a partially cutaway perspective view of a lens advancing device according to the second exemplary embodiment of the present invention. FIG. 10 is an exploded perspective view of the lens advancing device according to the same exemplary embodiment. FIG. 11A is a plan view of the holder of the lens advancing device according to the same exemplary embodiment. FIG. 11B is a partial sectional view illustrating part of cam surfaces formed on the holder of the lens advancing device according to the same exemplary embodiment.

First, as shown in FIGS. 9 and 10, lens advancing device 1 according to this exemplary embodiment includes at least lens unit 2; advancing ring 3; holder (base) 4; operation unit 5 (e.g., operation lever); elastic body 8; and pressing part 9.

Lens unit 2 is composed of lens 2a and lens holder 2b. The outer circumferential surface of lens holder 2b has male screw 2c formed thereon.

Advancing ring 3 is composed of cylinder 3b into which lens holder 2b is incorporated, and placing face 3f and operation unit 5, both provided on the outer circumference of cylinder 3b. The inner circumferential surface of cylinder 3b of advancing ring 3 has female screw 3a formed therein. Male screw 2c of lens holder 2b is screwed to female screw 3a to cause lens holder 2b to be incorporated into cylinder 3b of advancing ring 3.

Placing face 3f formed on the outer circumferential surface of advancing ring 3 has elastic body 8 placed thereon that is substantially or completely ring-shaped and is circular as viewed in a cross section, made of synthetic rubber, for example. At this moment, formation is made so that the diameter of placing face 3f of advancing ring 3 at cylinder 3b is larger than the internal diameter of elastic body 8. This structure allows elastic body 8 to press advancing ring 3 not only along the optical axis but orthogonally across the optical axis, thereby dispersing an elastic force (pressing force) of elastic body 8.

Here, lens 2a, lens holder 2b, holder 4 and operation unit 5 are typically made of a resin material similar to that of the first exemplary embodiment, with the same thermal expansion coefficient.

As shown in FIGS. 9 through 11B, holder 4 serving as the base of lens advancing device 1 of this exemplary embodiment is composed of supporting part 4a having projections 4b supporting advancing ring 3; protrusions 4e fixing pressing part 9; and cylindrical part 4c rotatably displacing advancing ring 3. Projections 4b are placed at the four corners, for instance, of supporting part 4a. Cylindrical part 4c is formed inside supporting part 4a and each of projections 4b.

Then, as shown in FIG. 10, the bottom of cylindrical part 4c of holder 4 has opening 4d formed therein. Opening 4d has transparent plate 10 inserted thereinto and retaining plate 11 attached thereto so that transparent plate 10 is not detached from opening 4d.

Holder 4 is provided with protrusions 4e fixing pressing part 9 between projections 4b on opposing surfaces 4A of holder 4, and protrusions 4e engage opening 9e in projection 9b formed on pressing part 9 (described later). Further, holder 4 has cutout 4f that makes operation unit 5 of advancing ring 3 project outward on at least one of the two surfaces 4B orthogonally facing opposing surfaces 4A of holder 4.

As shown in FIGS. 9 and 10, pressing part 9 is formed of separate members (i.e., cover 9A and retaining member 9B). Then pressing part 9, unified with holder 4 in the manner described below, abut-supports elastic body 8 and exerts an elastic force (urging force) on placing face 3f of advancing ring 3 through elastic body 8. This exerts the elastic force of elastic body 8 on advancing ring 3 to press abutting part 7 against either one of cam surfaces 6A, 6C, and 6B (described later).

Cover 9A of pressing part 9 includes plain plate 9a pressing advancing ring 3 through elastic body 8; and two projections 9b provided vertically to at least two opposing sides of plain plate 9a. Here, the four corners of plain plate 9a have abutting recesses 9c formed therein abutting the inner surfaces of projections 4b of holder 4.

Retaining member 9B of pressing part 9 is formed of a ring-shaped body that is rectangular as viewed in a cross section, having a top surface, an undersurface, an inner circumferential surface, and an outer circumferential surface. The undersurface of retaining member 9B is provided thereon with counter face 9d (refer to FIGS. 12A and 12B) facing placing face 3f of advancing ring 3; and projection 9h projecting in the radial direction.

Then, opening 9e formed in projection 9b of cover 9A engages protrusions 4e formed on holder 4. At this moment, projection 9h of retaining member 9B fits into cutout 4f of holder 4 and is fixed, and pressing part 9 is fixed to holder 4. Herewith, pressing part 9 composed of cover 9A and retaining member 9B presses elastic body 8 against placing face 3f on the outer circumferential surface of cylinder 3b of advancing ring 3. Consequently, advancing ring 3 undergoes an urging force of elastic body 8 to press abutting part 7 against either one of cam surfaces 6A, 6C, and 6B.

As shown in FIG. 10, the undersurface of holder 4 has sensor assembly 12 attached thereon composed of imaging element 13, transparent plate 14, and substrate 16 with imaging element 13 mounted thereon.

As shown in FIGS. 10 through 11B, advancing ring 3 is rotatably retained and accommodated movably along the optical axis inside cylindrical part 4c of holder 4. Then, either one of advancing ring 3 and holder 4 has cam surfaces 6A, 6C, and 6B formed thereon; the other of advancing ring 3 and holder 4 has abutting part 7 formed thereon capable of engaging cam surfaces 6A, 6C, and 6B.

At this moment, rotating advancing ring 3 by operation unit 5 changes the engaging position of abutting part 7 with cam surfaces 6A, 6C, and 6B, which displaces advancing ring 3 along the optical axis of lens unit 2. Consequently, lens unit 2 is displaced along the optical axis.

Concretely, as shown in FIG. 11B, cam surfaces 6A, 6C, and 6B are formed unevenly (in different heights) with supporting part 4a of holder 4 so that cam surface 6B is higher than cam surface 6A. Cam surfaces 6A and 6B are continuously connected to each other on the slope of cam surface 6C. At this moment, setting is made so that cam surface 6A corresponds to the normal photographing mode; and cam surface 6B, to macro photographing mode.

Hereinafter, a description is made using FIGS. 12A and 12B, of the relationship between pressing part 9, holder 4, and elastic body 8, where pressing part 9 makes abutting part 7 of advancing ring 3 abut a cam surface of holder 4 by unifying pressing part 9 and holder 4 through elastic body 8, which is a feature of this exemplary embodiment.

Figure 12A:
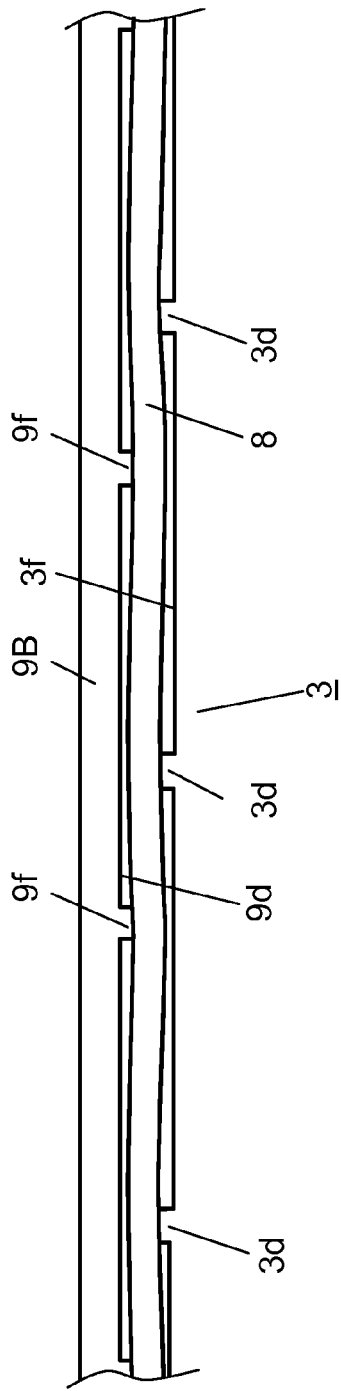
FIG. 12A is a 360-degree development of an elastic body between the retaining member and the advancing ring of the lens advancing device in normal photographing according to the same exemplary embodiment.

FIG. 12A is a 360-degree development of the elastic body between the retaining member and the advancing ring of the lens advancing device in normal photographing according to the same exemplary embodiment. FIG. 12B is a 360-degree development of the elastic body in macro photographing according to the same exemplary embodiment.

Figure 12B:
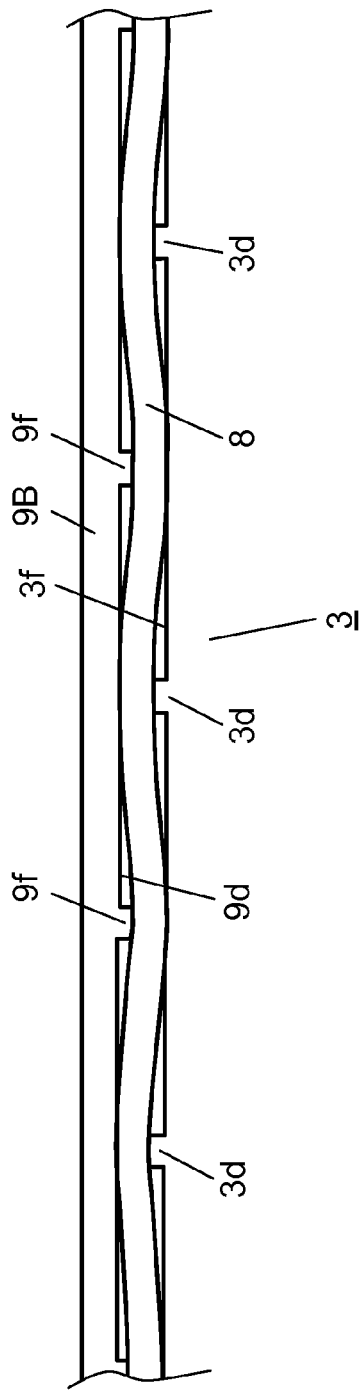
FIG. 12B is a 360-degree development of an elastic body between the retaining member and the advancing ring of the lens advancing device in macro photographing according to the same exemplary embodiment.

As shown in FIGS. 12A and 12B, placing face 3f of advancing ring 3 is provided thereon with a plurality of first projections 3d at given intervals in the circumferential direction. Meanwhile, counter face 9d of retaining member 9B of pressing part 9 (counter face 9d faces placing face 3f of advancing ring 3) has a plurality of second projections 9f formed circumferentially at given intervals, at positions circumferentially phase-shifted from first projections 3d. At this moment, first projections 3d and second projections 9f are provided at positions trisecting the circumference (120° intervals), for instance. In the normal photographing mode (refer to FIG. 12A), first projections 3d are placed at positions 40° phase-shifted from second projections 9f.

As shown in FIGS. 12A and 12B, a plurality of first projections 3d are projectingly provided so that the distance between the front end of first projections 3d and counter face 9d of retaining member 9B is the same as or slightly larger than the thickness (i.e., diameter of the cross-section shape of elastic body 8) of elastic body 8 in the optical axis direction. In the same way, a plurality of second projections 9f are projectingly provided so that the distance between the front end of second projections 9f and placing face 3f of advancing ring 3 is the same as or slightly larger than the thickness (i.e., thickness of the cross-section shape of elastic body 8) of elastic body 8 in the optical axis direction.

Then as shown in FIGS. 12A and 12B, in at least a state where operation unit 5 (that changes the photographing mode such as normal and macro) is rotatable, elastic body 8 is placed between first projections 3d and second projections 9f in a staggered manner, for instance, extended in the circumferential direction of advancing ring 3 in a meandering manner. Herewith, elastic body 8 extends in the circumferential direction, and thus the thickness of elastic body 8 in the optical axis direction becomes relatively small.

At this moment, first projections 3d move between adjacent second projections 9f according to rotation of advancing ring 3 by operation unit 5. Concretely, when the photographing mode changes from normal shown in FIG. 12A to macro shown FIG. 12B, advancing ring 3 rotates by 20°, for instance, and thus first projections 3d change to positions 60° phase-shifted from second projections 9f in the macro photographing mode.

Hereinafter, a description is made of operation of lens advancing device 1 using FIGS. 13A through 14B, for the case where holder 4 has cam surfaces 6A, 6C, and 6B formed thereon and advancing ring 3 has abutting part 7 formed thereon capable of engaging cam surfaces 6A, 6C, and 6B, as an example.

Figure 13A:
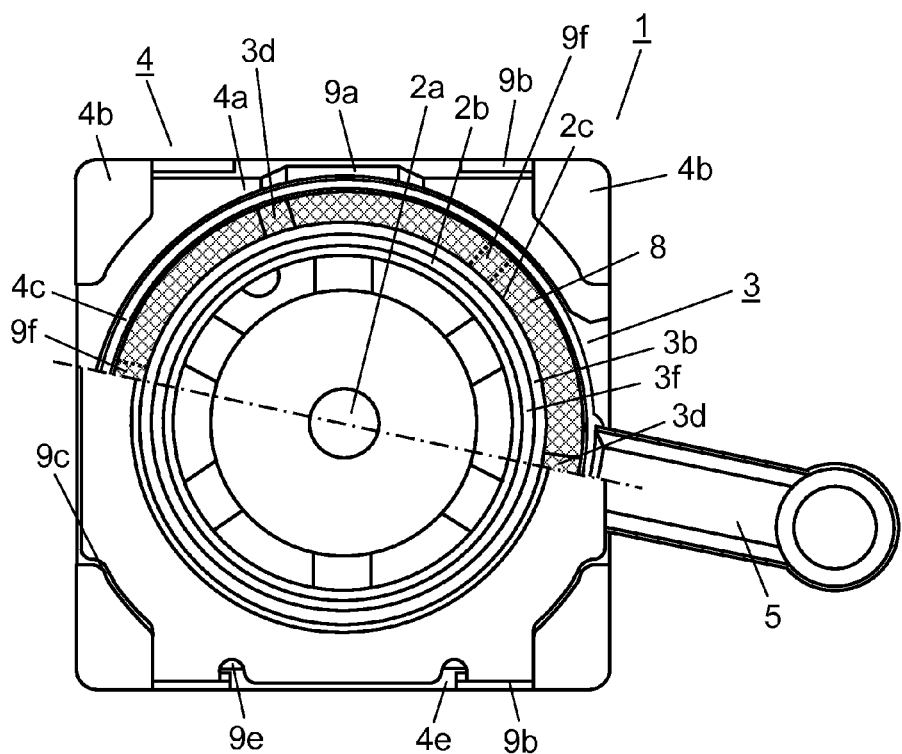
FIG. 13A is a cutaway plan view of the lens advancing device in normal photographing according to the same exemplary embodiment.
Figure 13B:
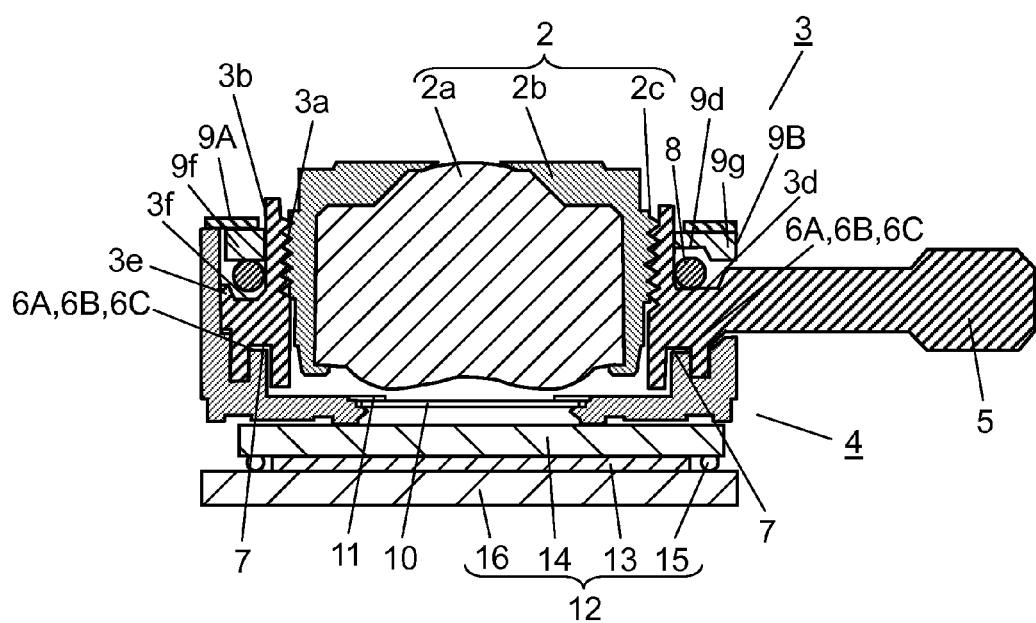
FIG. 13B is a sectional view of the lens advancing device in normal photographing according to the same exemplary embodiment.
Figure 14A:
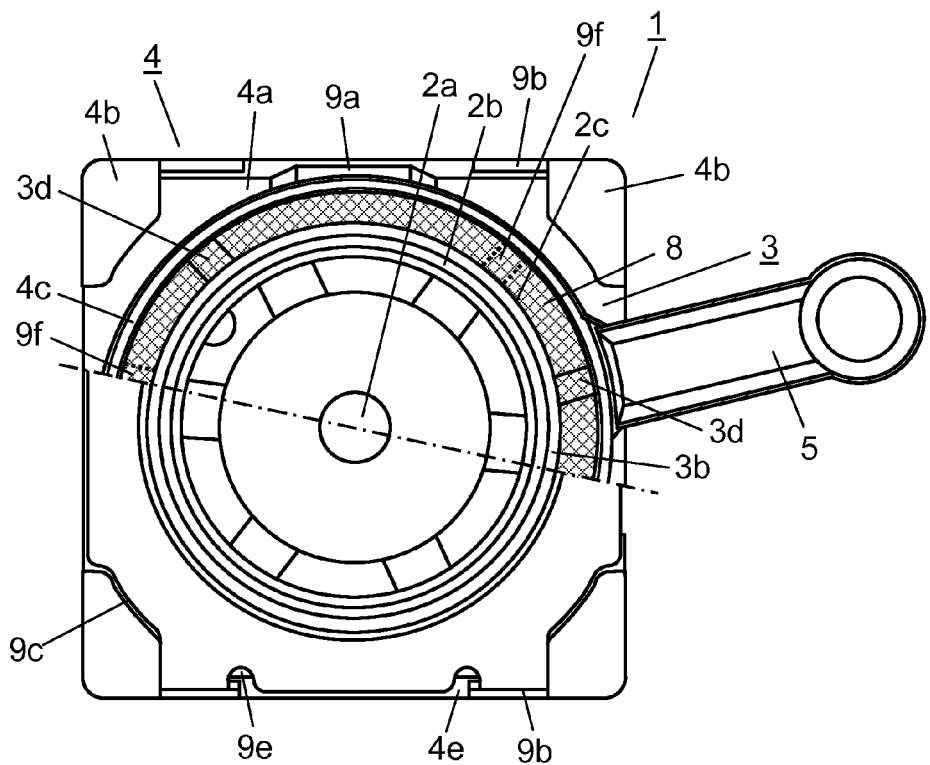
FIG. 14A is a cutaway plan view of the lens advancing device in macro photographing according to the same exemplary embodiment.
Figure 14B:
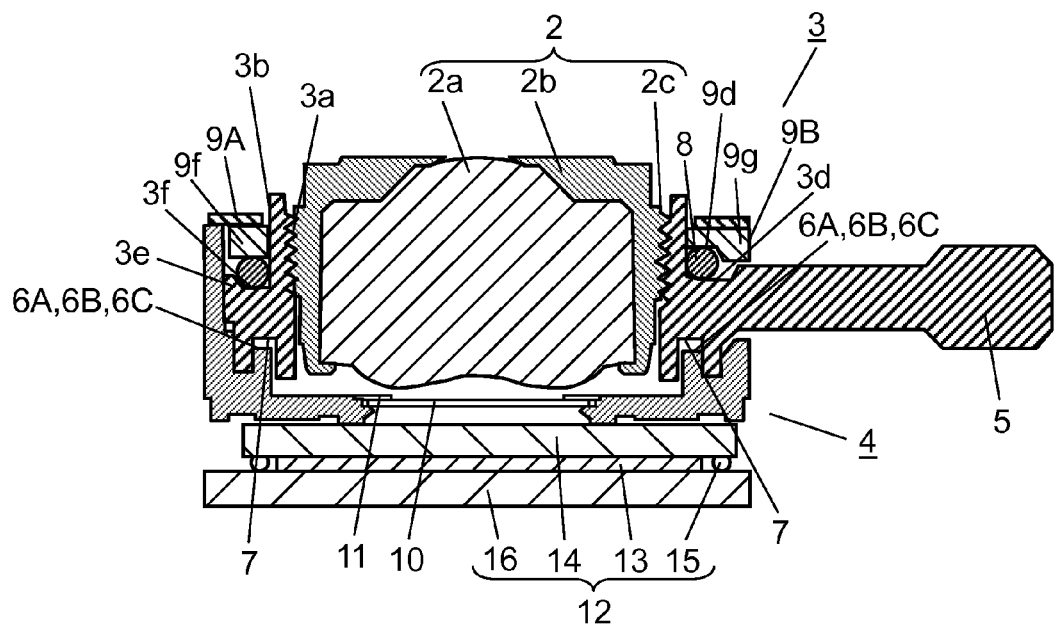
FIG. 14B is a sectional view of the lens advancing device in macro photographing according to the same exemplary embodiment.

FIG. 13A is a cutaway plan view of the lens advancing device in normal photographing according to the same exemplary embodiment. FIG. 13B is a sectional view of the lens advancing device in normal photographing according to the same exemplary embodiment. FIG. 14A is a cutaway plan view of the lens advancing in macro photographing according to the same exemplary embodiment. FIG. 14B is a sectional view of the lens advancing device in macro photographing according to the same exemplary embodiment.

First, as shown in FIGS. 13A and 13B, operation unit 5 rotates advancing ring 3 to make abutting part 7 of advancing ring 3 engage cam surface 6A of holder 4. This causes lens unit 2 to be displaced along the optical axis to change the photographing mode to normal. Meanwhile, as shown in FIGS. 14A and 14B, operation unit 5 rotates advancing ring 3 to make abutting part 7 of advancing ring 3 engage cam surface 6B of holder 4. This causes lens unit 2 to be displaced along the optical axis to change the photographing mode to macro. In other words, changing the engagement of abutting part 7 of advancing ring 3 with cam surfaces 6A and 6B of holder 4 through cam surface 6C allows the photographing mode to be smoothly changed between normal and macro.

As shown in FIGS. 13B and 14B, placing face 3f of advancing ring 3 is provided thereon with wall 3e formed of a ring shape, a C-ring shape, or a plurality of arc shapes, for instance, outside the external diameter of elastic body 8, which prevents elastic body 8 from escaping from placing face 3f of advancing ring 3 to the outside.

In the same way, counter face 9d of retaining member 9B of pressing part 9 is provided thereon with wall 9g formed of a ring shape, a C-ring shape, or a plurality of arc shapes, for instance, outside the external diameter of elastic body 8, which prevents elastic body 8 from escaping from counter face 9d of retaining member 9B of pressing part 9 to the outside.

A description is made of an example of how to assemble lens advancing device 1 according to the exemplary embodiment structured as above referring to FIG. 10.

First, attach elastic body 8 to placing face 3f of advancing ring 3.

Next, place advancing ring 3 with elastic body 8 attached thereto on supporting part 4a of holder 4 with transparent plate 10 and retaining plate 11 attached to opening 4d. At this moment, abutting part 7 of advancing ring 3 is placed inside cylindrical part 4c formed inside supporting part 4a and projections 4b. Mounting is made in a state where abutting part 7 engages either one of cam surfaces 6A and 6B, for instance.

Next, place pressing part 9 composed of cover 9A and retaining member 9B onto advancing ring 3 mounted on holder 4 to unify them. At this moment, protrusions 4e formed on holder 4 engage opening 9e in projection 9b formed on pressing part 9 to mount advancing ring 3 to holder 4. This allows advancing ring 3 mounted to holder 4 by pressing part 9 to be rotatably retained inside cylindrical part 4c of holder 4. In other words, advancing ring 3, positioned between pressing part 9 and supporting part 4a of holder 4, is placed movably (displaceably) along the optical axis.

At this moment, elastic body 8 attached between counter face 9d of retaining member 9B of pressing part 9 and placing face 3f of advancing ring 3 is pressed against placing face 3f by counter face 9d of retaining member 9B of pressing part 9. This causes elastic body 8 to be elastically deformed. Then, an elastic force due to deformation of elastic body 8 causes abutting part 7 of advancing ring 3 to be pressed against either one of cam surfaces 6A and 6B.

Next, after mounting advancing ring 3, rotate operation unit 5 to the position of the normal photographing mode as shown in FIGS. 12A and 12B. This allows advancing ring 3 to be retained in a state where abutting part 7 of advancing ring 3 pressed against cam surface 6A of holder 4.

Next, screw-fit male screw 2c formed on the outer circumferential surface of lens holder 2b into female screw 3a formed in the inner circumferential surface of advancing ring 3 in a state where advancing ring 3 is retained.

Next, attach sensor assembly 12 onto the undersurface of holder 4.

Next, after adjusting the focus distance of lens unit 2, unify advancing ring 3 and lens holder 2b with an adhesive, for instance.

Then, as shown in FIGS. 13A and 13B, rotating operation unit 5 to the position of the macro photographing mode allows abutting part 7 of advancing ring 3 to be retained in a state pressed against cam surface 6B of holder 4.

The above method completes assembling of the lens advancing device according to the exemplary embodiment that smoothly changes the photographing mode between normal and macro through rotational operation of operation unit 5.

According to this exemplary embodiment, placing face 3f formed on the outer circumferential surface of cylinder 3b of advancing ring 3 is provided thereon with a plurality of first projections 3d at given intervals in the circumferential direction. Meanwhile, counter face 9d of retaining member 9B of pressing part 9 is provided thereon with a plurality of second projections 9f at given intervals in the circumferential direction, at positions circumferentially phase-shifted from first projections 3d. When operation unit 5 rotates advancing ring 3 from the position of the normal mode to macro in this state, a plurality of first projections 3d formed on placing face 3f of advancing ring 3 move between adjacent second projections 9f formed on counter face 9d of retaining member 9B. Herewith, elastic body 8 is pressed along the optical axis of lens unit 2 in a state where elastic body 8 is placed between first projections 3d and second projections 9f in a staggered manner and is extended in the circumferential direction of advancing ring 3 in a meandering manner. At this moment, elastic body 8 extends in the circumferential direction, and consequently the thickness of elastic body 8 in the optical axis direction becomes relatively small. Formation is made so that the diameter of placing face 3f of advancing ring 3 at cylinder 3b is larger than the internal diameter of elastic body 8. This structure allows elastic body 8, due to its deformation, to press advancing ring 3 not only along the optical axis but orthogonally across the optical axis. Further, even if advancing ring 3 is rotated to change the photographing mode between normal and macro, the extending state of elastic body 8 does not largely change. Herewith, elastic body 8 urges placing face 3f with the aid of a reactive force due to elastic deformation in the circumferential direction of lens advancing device 1. Consequently, load fluctuation in the moving direction (optical axis direction) of lens unit 2 becomes relatively small, thereby smoothly rotating advancing ring 3.

Consequently, the present invention reduces fluctuation of resistance in rotational operation by operation unit 5, smoothly switches between cam surfaces 6A and 6B engaging abutting part 7, and changes the photographing mode (e.g., normal, macro) without unnatural feeling.

The present invention reduces influence on an urging force (elastic force) due to a dimensional error of elastic body 8 and its surrounding members. More specifically, receiving an urging force of pressing part 9 at a small number of points (contact surface areas) of first and second projections reduces influence on fluctuation of an urging force due to compression when switching, especially when a cam surface is positioned high.

According to this exemplary embodiment, elastic body 8 can be pressed against advancing ring 3 through pressing part 9 integrally engaging cover 9A with retaining member 9B. This reliably presses elastic body 8 in the circumferential direction of advancing ring 3 through a plurality of first projections 3d formed in the circumferential direction of advancing ring 3 and through a plurality of second projections 9f formed on retaining member 9B of pressing part 9. Consequently, rotational operation of advancing ring 3 by operation unit 5 can be performed more stably.

The present invention is not limited to the above exemplary embodiments, but clearly, various types of modifications may be added within a scope that does not deviate from the gist of the present invention.

In the first and second exemplary embodiments, the description is made of the example where holder 4 has cam surfaces 6A, 6C, and 6B formed thereon and advancing ring 3 has abutting part 7 formed thereon, but the present invention is not limited to the example. For example, advancing ring 3 may have cam surfaces 6A, 6C, and 6B formed thereon; holder 4, abutting part 7 capable of engaging cam surfaces 6A, 6C, and 6B. In this case as well, rotating advancing ring 3 by operation unit 5 allows changing the position of engaging abutting part 7 with cam surfaces 6A, 6C, and 6B, thereby displacing advancing ring 3 along the optical axis of lens unit 2, which is consequently displaced along the optical axis, In the first and second exemplary embodiments, the description is made of the example where elastic body 8 is formed of a synthetic rubber material, but not limited to the example. Silicone rubber, urethane rubber, or fluorine rubber, for instance, may be used, which increases versatility.

In the first and second exemplary embodiments, the description is made of the example where elastic body 8 is used in raw material, but not limited to the example. The outer surface of the elastic body may be applied with a lubricant such as hydro-fluoro-ether, thereby further smoothing contact between elastic body 8 and tapered part 3c. Consequently, rotational operation of advancing ring 3 by operation unit 5 can be performed more smoothly and stably.

In the first and second exemplary embodiments, the description is made of the example where cam surfaces are formed on holder 4 so that cam surface 6B is higher than cam surface 6A, but not limited to the example. For example, cam surfaces may be formed on holder 4 so that cam surface 6A is higher than cam surface 6B. In other words, cam surfaces may be formed in any way as long as rotational operation by operation unit 5 can change the photographing mode between normal and macro. Consequently, a lens advancing device is provided with high versatility suitable to the shape and application.

In the first and second exemplary embodiments, the description is made of the example where the two photographing modes (i.e., normal and macro) are changed, but not limited to the example. To change to another photographing mode (e.g., zoom, wide-angle), a cam surface other than cam surfaces 6A and 6B may be provided on holder 4 and advancing ring 3 to be engaged with abutting part 7. This provides a lens advancing device with high versatility and high functionality according to applications.

In the first exemplary embodiment, the description is made of the example where elastic body 8 is ring-shaped as viewed in a cross section (viewed from the cross section), but not limited to the example. A metal wire (e.g., piano wire, stainless-steel wire) may be formed into a C-ring shape to be used as an elastic body. In this case, tapered part 3c can be urged with the aid of a reactive force due to elastic deformation in the radial direction of C-ring-shaped elastic body 8. This reduces load fluctuation in the moving direction (optical axis direction) of lens unit 2. Consequently, elastic body 8 can displace advancing ring 3 along the optical axis while sufficiently providing an urging force of advancing ring 3 by elastic body 8. Further, elastic body 8 can be produced inexpensively.

In the second exemplary embodiment, the friction coefficient between retaining member 9B and elastic body 8 is not especially mentioned. It is however favorable that retaining member 9B is formed of a resin material such as polyacetal (POM) or polyarylate (PAR) with its friction coefficient smaller than that of elastic body 8. This reduces frictional resistance between retaining member 9B and elastic body 8, which suppresses resistance in rotational operation of advancing ring 3 by operation unit 5 and allows more smooth operation without weakening an urging force (elastic force) by elastic body 8.

In the second exemplary embodiment, the description is made of the example where cover 9A and retaining member 9B both composing pressing part 9 are formed of different materials, but not limited to the example. Cover 9A and retaining member 9B may be integrally formed, for instance, which simplifies the structure to increase workability.

As described above, the lens advancing device of the first exemplary embodiment includes an advancing ring holding the lens unit; a holder rotatably supporting the advancing ring; an operation unit for rotating the advancing ring, a cam surface formed on one of the advancing ring and the holder; and an abutting part formed on the other of the advancing ring and the holder and is engageable with the cam surface. The lens unit is displaced along the optical axis by rotating the advancing ring and thereby changing the engaging position between the cam surface and the abutting part. The lens advancing device further includes a tapered part formed on the outer circumferential surface of the advancing ring; an elastic body attached to the tapered part; and a pressing part coupled to the holder, and retaining the elastic body by abutment to make the elastic body exert an elastic force upon the advancing ring and press the abutting part against the cam surface.

With this structure, rotary motion of the advancing ring is transformed to reciprocating motion (back-and-forth motion along the optical axis) of the lens unit, and thus rotating the advancing ring by the operation unit causes the elastic body abut-supported by the pressing part to be pressed against the tapered part formed on the outer circumferential surface of the advancing ring, resulting in elastic deformation. At this moment, the tapered part causes a load (an urging force by the elastic body) exerted along the moving direction (optical axis direction) of the lens unit to be dispersed in the moving direction and in its orthogonal direction (radial direction of the advancing device). Then, the elastic body urges the tapered part with the aid of a reactive force due to elastic deformation in the radial direction of the lens advancing device. This reduces load fluctuation in the moving direction (optical axis direction) of the lens unit to smoothly rotate the advancing ring 3. In other words, with a reactive force due to elastic deformation of the elastic body, the advancing ring can be displaced along the optical axis while sufficiently providing an urging force of the advancing ring. This reduces changes of resistance in rotational operation of the advancing ring by the operation unit between photographing modes (e.g., normal, macro), which makes the user feel less uncomfortable. This reduces influence on individual variations of an urging force (elastic force) due to a dimensional error of the elastic body and its surrounding members.

In the lens advancing device of the first exemplary embodiment, the contact surface of the elastic body with the tapered part is arc-shaped in cross section; the contact surface of the elastic body with the pressing part is rectangular in cross section. According to this structure, the elastic body line-contacts the tapered part and surface-contacts the pressing part, which increases the frictional resistance at the contact surface between the elastic body and the pressing part. This prevents a slip at the contact surface between the elastic body and the pressing part in rotational operation of the advancing ring by the operation unit and smoothes contact between the elastic body and the tapered part, resulting in stable rotational operation of the advancing ring by the operation unit.

In the lens advancing device of the first exemplary embodiment, the diameter of the advancing part at a position at which the elastic body contacts the tapered part of the advancing ring is larger than the internal diameter of the elastic body. This structure reliably obtains a contact surface between the elastic body and the tapered part of the advancing ring to increase close contactness, which prevents the elastic body from escaping to the outside of tapered part. This smoothes contact between the elastic body and the tapered part, allowing stable rotational operation of the advancing ring by the operation unit while downsizing the advancing ring.

In the lens advancing device of the first exemplary embodiment, the tapered part of the advancing ring has a cutout. This structure reduces the area size of the contact surface between the elastic body and the tapered part to decrease frictional resistance between the elastic body and the advancing ring, which allows more stable rotational operation of the advancing ring.

The lens advancing device of the first exemplary embodiment, a plurality of the cutouts are provided at regular intervals. This structure limits the contact surface between the advancing ring urged by the elastic body and the tapered part by providing cutouts at 60° regular intervals, for instance, which allows stable rotational operation of the advancing ring.

In the lens advancing device of the first exemplary embodiment, a spacer with its friction coefficient smaller than that of the elastic body is disposed between the pressing part and the elastic body. This structure further reduces frictional resistance between the pressing part and the elastic body, which allows more smooth rotational operation of the advancing ring by the operation unit.

The lens advancing device of the second exemplary embodiment includes an advancing ring holding the lens unit; a holder rotatably supporting the advancing ring; an operation unit for rotating the advancing ring, a came surface formed on one of the advancing ring and the holder, and a abutting part formed on the other of the advancing ring and the holder and is engageable with the came surface. The lens unit is displaced along an optical axis by rotating the advancing ring and thereby changing an engaging position between the cam surface and the abutting part The lens advancing device further includes a placing face formed on the outer circumference of the advancing ring; an elastic body placed on the placing face; and a pressing part coupled to the holder, and retaining the elastic body by abutment to make the elastic body exert an elastic force upon the advancing ring and press the abutting part the cam surface, the pressing part having a counter face formed at a position facing the placing face. One of the placing face and the counter face is provided thereon with a plurality of first projections formed circumferentially at given intervals. The other of the placing face and the counter face is provided thereon with a plurality of second projections formed circumferentially at given intervals, at positions circumferentially phase-shifted from the first projections. The first projections move between adjacent second projections according to rotation of the advancing ring.

According to this structure, the elastic body is placed between the first and second projections in a staggered manner and is extended in the circumferential direction of the advancing ring in a meandering manner. Accordingly, even if the operation unit rotates the advancing ring, the extending state due to meandering of the elastic body does not largely change. Consequently, extending the elastic body in the circumferential direction of the advancing ring in a meandering manner reduces fluctuation of a load (an urging force of the elastic body) in the moving direction (optical axis direction) of the lens unit. In other words, with a reactive force due to elastic deformation of the elastic body, the advancing ring can be displaced along the optical axis while sufficiently providing an urging force of the advancing ring. This reduces changes of resistance in rotational operation of the advancing ring by the operation unit between photographing modes (e.g., normal, macro), which makes the user feel less uncomfortable. This reduces influence on individual variations of an urging force (elastic force) due to a dimensional error of the elastic body and its surrounding members.

In the lens advancing device of the second exemplary embodiment, the diameter of the placing face of the advancing ring at the cylinder side is larger than the internal diameter of the elastic body. This structure causes an urging force of the elastic body to be exerted on the cylinder part of the advancing ring, thereby dispersing a load (an urging force by the elastic body) in the moving direction (optical axis direction) of the lens unit to the circumferential direction of the advancing ring. At this moment, the elastic body urges the placing face with the aid of a reactive force due to extend-deformation along the optical axis of the lens advancing device. This reduces load fluctuation in the moving direction (optical axis direction) of the lens unit.

In the lens advancing device of the second exemplary embodiment, the pressing part further includes a retaining member, the retaining member has a counter face formed thereon, and the counter face has a wall. This structure prevents the elastic body from escaping to the outside.

In the lens advancing device of the second exemplary embodiment, the placing face is provided thereon with a wall. This structure prevents the elastic body from escaping to the outside and from contacting surrounding members, resulting in smooth and stable rotational operation of the advancing ring by the operation unit. Further, the wall prevents ingress of an undesired substance to the imaging surface.

In the lens advancing device of the second exemplary embodiment, the retaining member is formed of a resin material with its friction coefficient smaller than that of the elastic body. This structure reduces frictional resistance between the retaining member and the elastic body, resulting in more smooth rotational operation of the advancing ring by the operation unit.

In the lens advancing device of each exemplary embodiment, the elastic body is ring-shaped or C-ring-shaped. This structure allows urging the advancing ring roughly evenly (equally) with the aid of an elastic force by ring-shaped elastic body 8 or a reactive force due to elastic deformation in the radial direction of C-ring-shaped elastic body 8.

In the lens advancing device of each exemplary embodiment, the elastic body is circular in a cross section. This structure causes the elastic body to line-contact the tapered part or placing face of the advancing ring, thereby reducing frictional resistance between the elastic body and the advancing ring, resulting in smooth rotational operation of the advancing ring by the operation unit.

In the lens advancing device of each exemplary embodiment, the outer surface of the elastic body is applied with a lubricant. This structure allows contact between the elastic body and the tapered part or the placing face of the advancing ring to be more smooth, resulting in more smooth and more stable rotational operation of the advancing ring by the operation unit.

In the lens advancing device of each exemplary embodiment, the elastic body is made of synthetic rubber material, silicone rubber, urethane rubber, or fluorine rubber. This provides a lens advancing device with a high elastic force (urging force) and high versatility.

The imaging device of each exemplary embodiment includes the above-described lens advancing device. With this configuration, rotating the advancing ring by the operation unit displaces the advancing ring along the optical axis, which displaces the lens unit along the optical axis. This provides an imaging device that allows easy photographing in various photographing modes such as normal and macro.

The portable electronic device of each exemplary embodiment includes the above-described imaging device. This provides a portable electronic device (e.g., digital camera, mobile phone with a camera function) to accurately focus at each photographing position (e.g., normal, macro).

INDUSTRIAL APPLICABILITY

The present invention is useful for a lens advancing device that demands reducing of resistance and unnatural feeling when switching between photographing modes (e.g., normal, macro), for an imaging device including the lens advancing device, and for a portable electronic device.

REFERENCE MARKS IN THE DRAWINGS

1 Lens advancing device
2 Lens unit
2a Lens
2b Lens holder
2c Male screw
3 Advancing ring
3a Female screw
3b Cylinder
3c Tapered part
3d First projection
3e, 9g Wall
3f Placing face
3g, 4f Cutout
4 Holder (base)
4A, 4B Surface
4a Supporting part
4b Projection
4c Cylindrical part
4d Opening
4e Protrusion
5 Operation unit
6A, 6B, 6C Cam surface
7 Abutting part
8 Elastic body
9 Pressing part
9A Cover
9B Retaining member
9a Plain plate
9b Projection
9c Abutting recess
9d Counter face
9e Opening
9f Second projection
9h Projection
10 Transparent plate
11 Retaining plate
12 Sensor assembly
13 Imaging element
14 Transparent plate
15 Solder ball
16 Substrate
17 Spacer

The invention claimed is:

1. A lens advancing device including an advancing ring holding a lens unit, a holder rotatably supporting the advancing ring, an operation unit for rotating the advancing ring, a cam surface formed on one of the advancing ring and the holder, and an abutting part formed on the other of the advancing ring and the holder and is engageable with the cam surface,
wherein the lens unit is displaced along an optical axis by turning the advancing ring and thereby changing an engaging position between the cam surface and the abutting part,
the lens advancing device further comprising:
a tapered part formed on an outer circumferential surface of the advancing ring;
an elastic body attached to the tapered part; and
a pressing part coupled to the holder, and retaining the elastic body by abutment to make the elastic body exert an elastic force upon the advancing ring and press the abutting part against the cam surface.

2. The lens advancing device of claim 1, wherein the elastic body is arc-shaped in cross section at a contact surface with the tapered part and rectangular as viewed in a cross section at a contact surface with the pressing part.

3. The lens advancing device of claim 1, wherein a diameter of the advancing ring at a position at which the elastic body contacts the tapered part of the advancing ring is larger than an internal diameter of the elastic body.

4. The lens advancing device of claim 1, wherein the tapered part of the advancing ring has a cutout.

5. The lens advancing device of claim 4, wherein a plurality of the cutouts are provided at regular intervals.

6. The lens advancing device of claim 1, wherein a spacer with a friction coefficient smaller than a friction coefficient of the elastic body is disposed between the pressing part and the elastic body.

7. The lens advancing device of claim 1, wherein the elastic body is ring-shaped or C-ring-shaped.

8. The lens advancing device of claim 1, wherein the elastic body is circular as viewed in a cross section.

9. The lens advancing device of claim 1, wherein an outer surface of the elastic body is applied with a lubricant.

10. The lens advancing device of claim 1, wherein the elastic body is made of synthetic rubber material, silicone rubber, urethane rubber, or fluorine rubber.

11. An imaging device including the lens advancing device of claim 1.

12. A portable electronic device including the imaging device of claim 11.

13. The lens advancing device of claim 1, wherein the elastic body is circular as viewed in a cross section.

14. A lens advancing device including an advancing ring holding a lens unit, a holder rotatably supporting the advancing ring, an operation unit for rotating the advancing ring, a cam surface formed on one of the advancing ring and the holder, and an abutting part formed on the other of the advancing ring and the holder and is engageable with the cam surface,
wherein the lens unit is displaced along an optical axis by turning the advancing ring and thereby changing an engaging position between the cam surface and the abutting part,
the lens advancing device further comprising:
a placing face formed on an outer circumference of the advancing ring;
an elastic body disposed on the placing face; and
a pressing part coupled to the holder, and retaining the elastic body by abutment to make the elastic body exert an elastic force upon the advancing ring and press the abutting part against the cam surface, the pressing part having a counter face formed at a position facing the placing face,
wherein one of the placing face and the counter face is provided thereon with a plurality of first projections formed circumferentially at given intervals, and
the other of the placing face and the counter face is provided thereon with a plurality of second projections formed circumferentially at given intervals, at positions circumferentially phase-shifted from the first projections, and wherein the first projections move between the adjacent second projections according to rotation of the advancing ring.

15. The lens advancing device of claim 14, wherein a diameter of the placing face of the advancing ring at a cylinder side is larger than an internal diameter of the elastic body.

16. The lens advancing device of claim 14, wherein the pressing part further includes a retaining member having a counter face formed thereon, the counter face having a wall.

17. The lens advancing device of claim 16, wherein the retaining member is formed of a resin material with a friction coefficient smaller than a friction coefficient of the elastic body.

18. The lens advancing device of claim 14, wherein the placing face includes a wall.

19. The lens advancing device of claim 14, wherein the elastic body is ring-shaped or C-ring-shaped.

20. The lens advancing device of claim 14, wherein an outer surface of the elastic body is applied with a lubricant.

21. The lens advancing device of claim 14, wherein the elastic body is made of synthetic rubber material, silicone rubber, urethane rubber, or fluorine rubber.

22. An imaging device including the lens advancing device of claim 14.

23. A portable electronic device including the imaging device of claim 22.

\* \* \* \* \*